US012353224B2

(12) United States Patent
Sahm et al.

(10) Patent No.: US 12,353,224 B2
(45) Date of Patent: Jul. 8, 2025

(54) CONFIGURABLE FLUID COMPRESSION APPARATUS, CONTROL, AND ASSOCIATED METHODS

(71) Applicant: TPE MIDSTREAM LLC, Tulsa, OK (US)

(72) Inventors: Douglas A. Sahm, Lutz, FL (US); Carson Depew, Tulsa, OK (US)

(73) Assignee: TPE MIDSTREAM LLC, Tulsa, OK (US)

( * ) Notice: Subject to any disclaimer, the term of this patent is extended or adjusted under 35 U.S.C. 154(b) by 0 days.

(21) Appl. No.: 18/042,166

(22) PCT Filed: Aug. 24, 2021

(86) PCT No.: PCT/US2021/047338
§ 371 (c)(1),
(2) Date: Feb. 17, 2023

(87) PCT Pub. No.: WO2022/046761
PCT Pub. Date: Mar. 3, 2022

(65) Prior Publication Data
US 2023/0315134 A1    Oct. 5, 2023

Related U.S. Application Data

(60) Provisional application No. 63/125,757, filed on Dec. 15, 2020, provisional application No. 63/070,631, filed on Aug. 26, 2020.

(51) Int. Cl.
*G05D 16/20*    (2006.01)
*F15B 11/032*   (2006.01)
*G05D 16/00*    (2006.01)

(52) U.S. Cl.
CPC ......... *G05D 16/204* (2013.01); *G05D 16/028* (2019.01)

(58) Field of Classification Search
CPC .... G05D 16/204; G05D 16/028; F15B 11/032
See application file for complete search history.

(56) References Cited

U.S. PATENT DOCUMENTS 5,218,997 A * 6/1993 Dunwoody ........ G05D 16/2097
137/596.18
2013/0287063 A1 * 10/2013 Kates ..................... G05B 15/02
374/143

(Continued)

FOREIGN PATENT DOCUMENTS

JP    2001153091 A    6/2001
JP    2009133232 A    6/2009

(Continued)

OTHER PUBLICATIONS

IP Australia, "Examination Report No. 1," issued in connection with Australian Patent Application No. 2021332210, issued on Jul. 24, 2023, 4 pages.

(Continued)

*Primary Examiner* — Paul J Gray
(74) *Attorney, Agent, or Firm* — Hanley, Flight & Zimmerman, LLC

(57) ABSTRACT

An apparatus to transfer a fluid from a fluid inlet to a fluid outlet is disclosed herein. An example apparatus includes a first compressor unit and a second compressor unit fluidly coupled between the first and second locations, and a valve coupled between the first and second compressor units, the valve to switch between a first state and a second state, the fluid to flow through the first and second compressor units in a parallel configuration when the valve is in the first state, the fluid to flow through the first and second compressor units in a series configuration when the valve is in the second state.

10 Claims, 28 Drawing Sheets

(56) References Cited

U.S. PATENT DOCUMENTS

| | | |
|---|---|---|
| 2014/0380349 A1 | 12/2014 | Shankar et al. |
| 2016/0323616 A1 | 11/2016 | Doe |
| 2017/0353764 A1 | 12/2017 | Kurzynski et al. |
| 2019/0058878 A1 | 2/2019 | Nielsen et al. |
| 2020/0240405 A1 | 6/2020 | Bermich |

FOREIGN PATENT DOCUMENTS

| | | |
|---|---|---|
| JP | 2015102036 A | 6/2015 |
| KR | 20190036422 A | 4/2019 |
| WO | 2011121322 A | 10/2011 |

OTHER PUBLICATIONS

Sanchez et al., "ZSim: Fast and Accurate Microarchitectural Simulation of Thousand-Core Systems," ACM SIGARCH Computer Architecture News, Jun. 2013, 12 pages.

Australian Government, IP Australia, "Notice of acceptance for your patent application," issued in connection with Australian Patent Application No. 2021332210, dated Jan. 15, 2024, 4 pages.

Canadian Intellectual Property Office, "Examination Report," issued in connection with Canadian Patent Application No. 3,159,825, mailed on Sep. 1, 2023, 5 pages.

Saudi Authority for Intellectual Property, "Examination Report," issued in connection with Saudi Arabian Application No. 523442672, dated Nov. 3, 2023, 14 pages. [English machine translation included].

Intellectual Property Office of United Kingdom, "Examination Report under Section 18(3)," issued in connection with U.K. Patent Application No. 2302719.6, dated Jan. 15, 2024, 3 pages.

International Searching Authority "International Preliminary Report on Patentability," issued in connection with international Patent Application No. PCT/US2021/07338, mailed on Feb. 28, 2023, 5 pages.

International Searching Authority, "International Search Report and Written Opinion," issued in connection with international Patent Application No. PCT/US2020/037929, mailed on Sep. 25, 2020, 9 pages.

United Kingdom Intellectual Property Office, "Intention to Grant," issued in connection with United Kingdom Patent Application No. 2302719.6, dated Apr. 18, 2024, 2 pages.

Australian Government, IP Australia, "Certificate of Grant," issued in connection with Australian Patent Application No. 2021332210, dated May 9, 2024, 1 page.

European Patent Office, "Extended European Search Report," issued in connection with European Patent Application No. 21862566.3, issued on May 7, 2024, 6 pages.

European Patent Office, "Communication pursuant to Rules 70(2) and 70a(2) EPC," issued in connection with European Patent Application No. 21862566.3, dated May 27, 2024, 1 page.

United Kingdom Intellectual Property Office, "Notification of Grant," issued in connection with United Kingdom Patent Application No. 2302719.6, dated Jun. 4, 2024, 2 pages.

Kolstad, "Coaxial Solenoid Valves for High-Pressure Systems," Tameson's Technical Information Center, Product Information, Sep. 18, 2024, 4 pages.

United Kingdom Intellectual Property Office, "Notice of Publication," issued in connection with United Kingdom Patent Application No. 2302719.6, dated May 2, 2023 2 pages.

United Kingdom Intellectual Property Office, "Examination Report under Section 18(3)," issued in connection with United Kingdom Patent Application No. 2302719.6, dated Jan. 15, 2024, 3 pages.

United Kingdom Intellectual Property Office, "Intention to Grant under Section 18(4)," issued in connection with United Kingdom Patent Application No. 2302719.6, dated Apr. 18, 2024, 2 pages.

United Kingdom Intellectual Property Office, "Patents Act 1977: Search Report under Section 17," issued in connection with GB Patent Application No. 2406138.4, mailed on May 20, 2024, 4 pages.

Saudi Authority for Intellectual Property, "Notice of Substantive Examination Report," issued in connection with PCT Patent Application No. 523442672, mailed on Dec. 15, 2024, 18 pages. (with English machine translation).

United Kingdom Intellectual Property Office, "Examination Report and Notification of Intention to Grant under Section 18(4)," issued in connection with United Kingdom Patent Application No. GB2406138.4, dated Jan. 28, 2025, 2 pages.

United Kingdom Intellectual Property Office, "Search under Section 17," issued in connection with United Kingdom Patent Application No. 2501059.6, dated Feb. 4, 2025, 3 pages.

United Kingdom Patent Office, "Notification of Grant," issued in connection with U.K. Patent Application No. GB2626498, dated Apr. 15, 2025, 2 pages.

United Kingdom Patent Office, "Examination Report and Notification to Grant under Section 18(4)," issued in connection with United Kingdom Patent Application No. 2501059.6, dated Apr. 29, 2025, 2 pages.

* cited by examiner

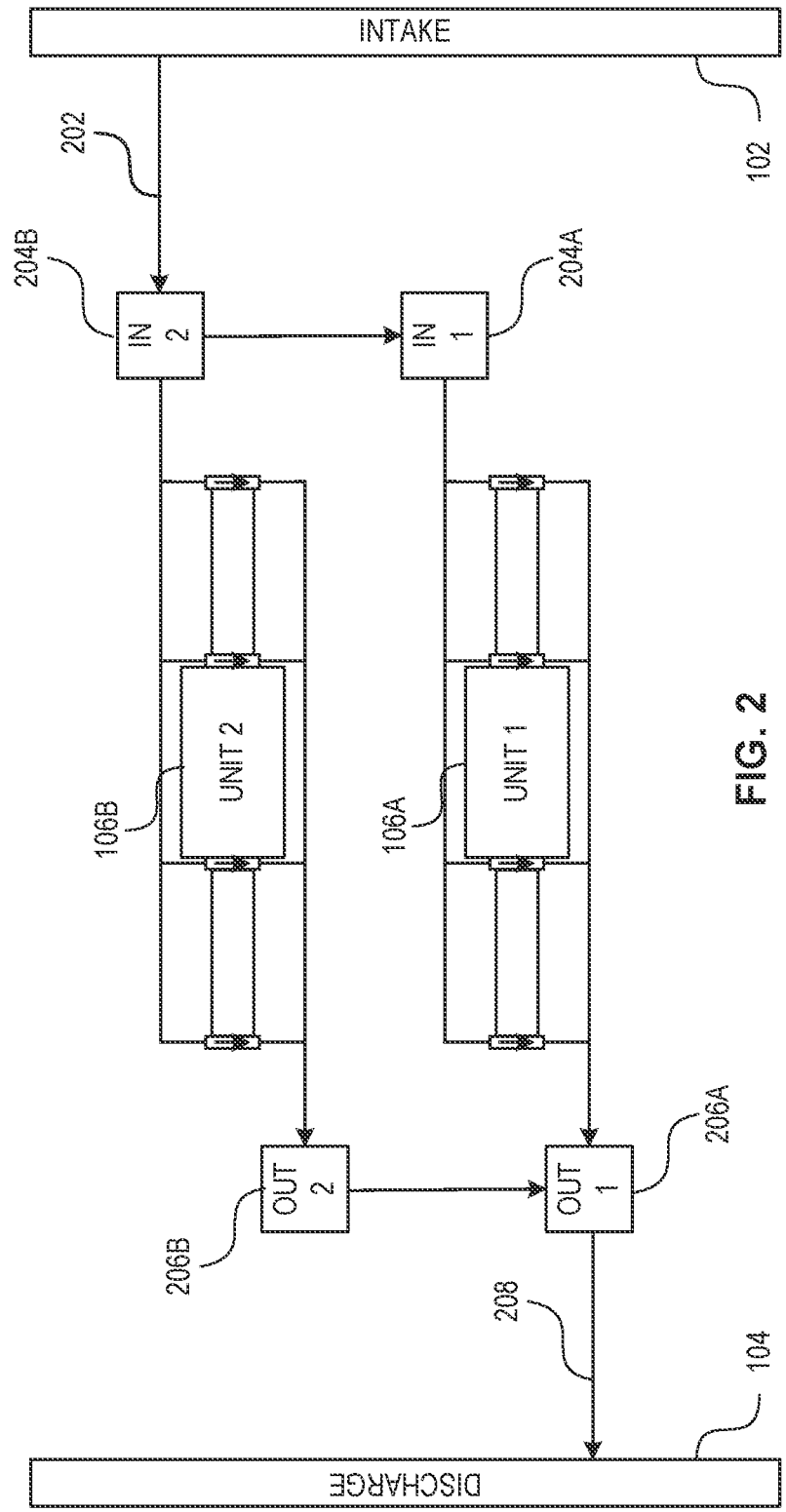

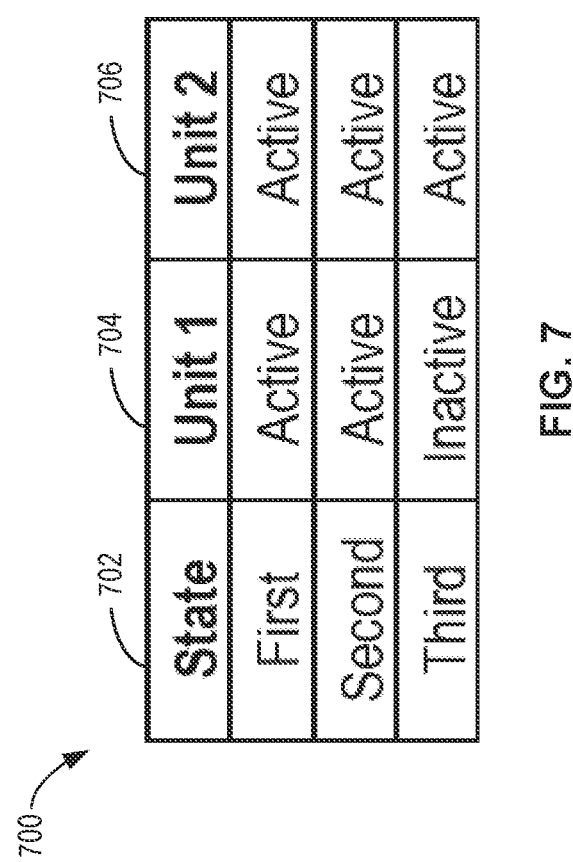

| 1st and 2nd Valves | 3rd and 4th Valves | 5th and 6th Valves | Max. Pressure (psi) | Rate (acfm) |
|---|---|---|---|---|
| Parallel | Parallel | Parallel | 200 | 4 |
| Parallel | Series | Parallel | 400 | 2 |
| Series | Series | Parallel | 600 | 1 |
| Series | Series | Series | 800 | 0.5 |

FIG. 11

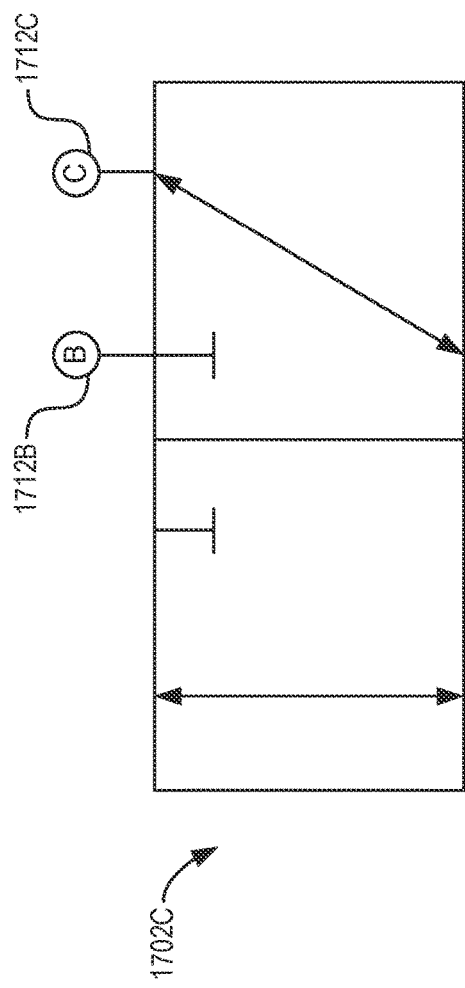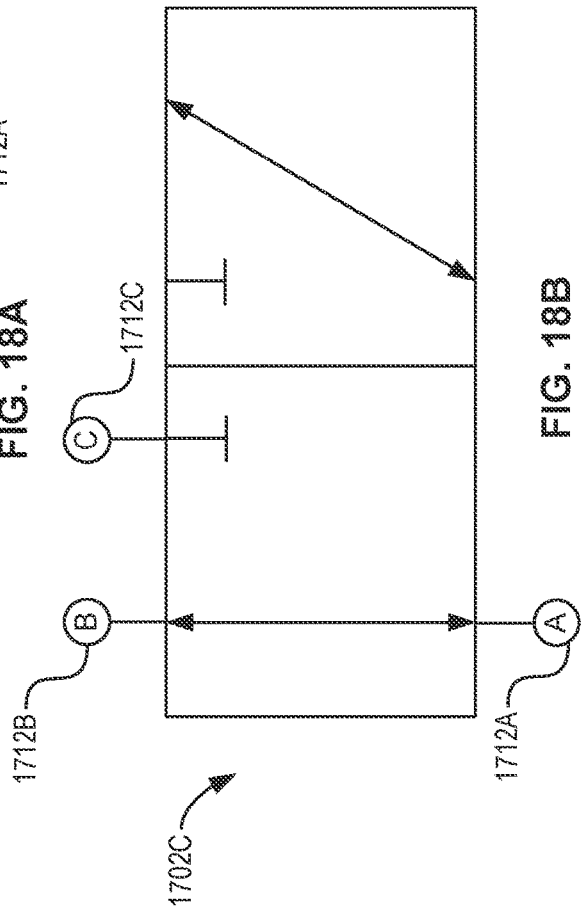

CONFIGURABLE FLUID COMPRESSION APPARATUS, CONTROL, AND ASSOCIATED METHODS

RELATED APPLICATIONS

This patent arises from a U.S. National Stage patent application under U.S.C. 371 of PCT Patent Application No. PCT/US21/47338, titled "Configurable Fluid Compression Apparatus, Control, and Associated Methods," filed Aug. 24, 2021, which claims priority to U.S. Provisional Application No. 63/070,631," titled "Configurable Fluid Compression Apparatus, Control, and Associated Methods," filed Aug. 26, 2020, and U.S. Provisional Application No. 63/125,757, titled "Configurable Fluid Compression Apparatus, Control, and Associated Methods," filed Dec. 15, 2020. PCT Patent Application No. PCT/US21/47338, U.S. Provisional Application No. 63/070,631 and U.S. Provisional Application No. 63/125,757 are hereby incorporated by reference in their entireties.

FIELD OF THE DISCLOSURE

This disclosure relates generally to compressors, and, more particularly, to configurable fluid compression apparatus, control, and associated methods.

BACKGROUND

Compressors can be used to transport a fluid between two or more locations. When the fluid is a gas, the compressors can increase pressure of the fluid while decreasing volume of the fluid. Multiple compressors can be used to achieve a desired pressure of the fluid.

BRIEF DESCRIPTION OF THE DRAWINGS

FIG. 2 illustrates the example compressor units of FIGS. 1A and/or 1B, where the compressor units are arranged in parallel.

FIG. 7 illustrates an example status table for the example compressor units of FIGS. 1A, 1B, 2, 3, and/or 4 for each state of the example control valves.

FIG. 11 illustrates an example table of compression pressures and rates of compression corresponding to combined states of the control valves of FIGS. 8, 9A-9E, and/or 10.

FIG. 18A is a schematic illustration of the third example coaxial valve of FIG. 17 in the first state.

FIG. 18B is a schematic illustration of the third example coaxial valve of FIG. 17 in the second state.

Figure 1A:
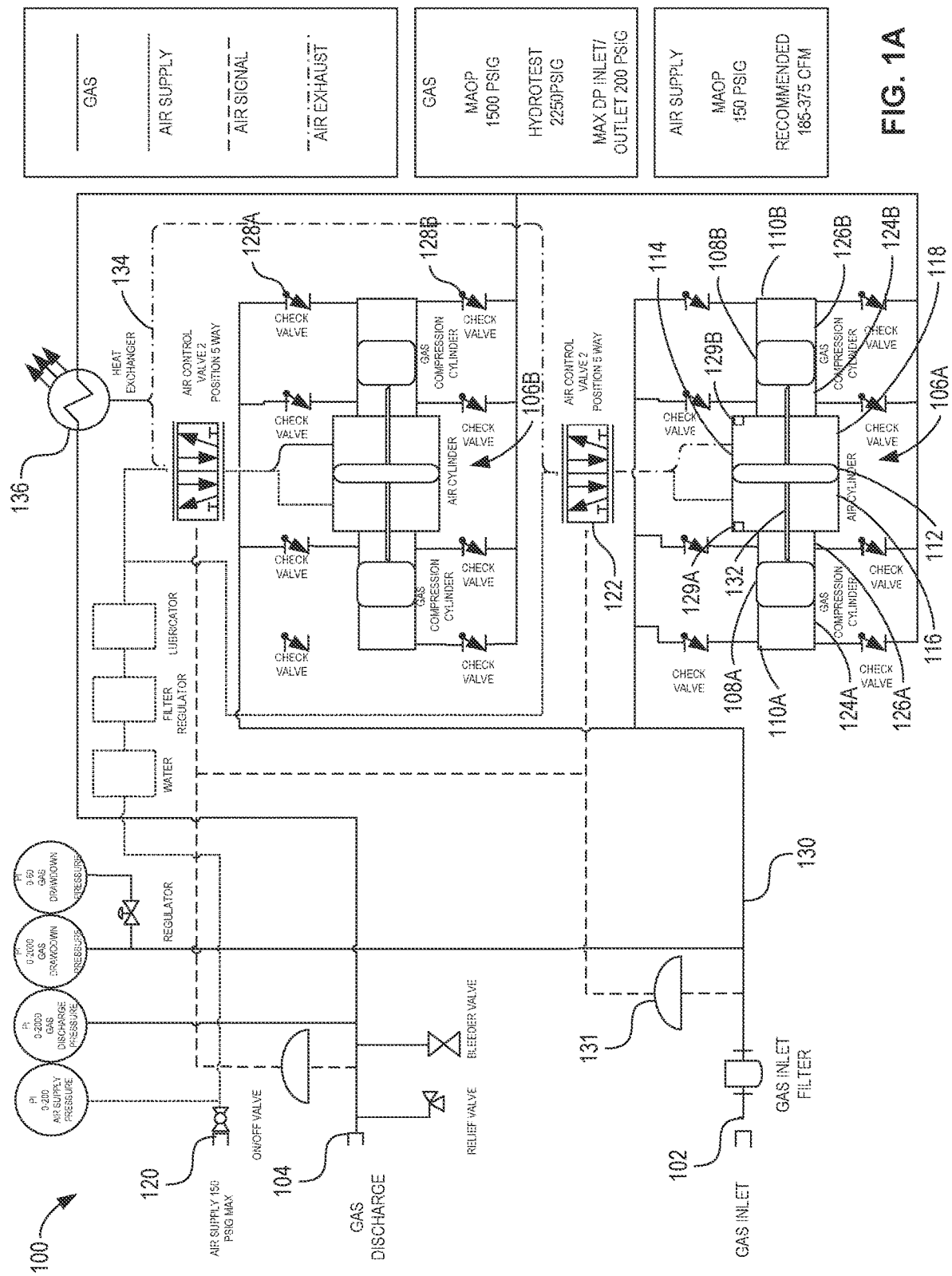
FIG. 1A is a schematic illustration of an example fluid transfer and depressurization system from prior art.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Compressors implemented on fluid pipelines to facilitate transport of a fluid (e.g., gas, oil, water) therein. In cases in which the fluid is a gas, compressors can reduce volume of the gas while increasing pressure during transport. Multiple compressor units can be implemented in a fluid transfer and depressurization system. In some cases, the fluid transfer and depressurization system can evacuate fluid from a first section of pipe and transfer the fluid to a second section of pipe. In such examples, the volume, rate, and/or pressure of the fluid transferred by the compressor units depends on an arrangement of the compressor units.

In some examples, a pair of the compressor units can be arranged in parallel. In such examples, the fluid from a fluid inlet enters each compressor unit separately, then exits each compressor unit and recombines into a single flow to a fluid outlet. In other examples, in which the pair of the compressor units are arranged in series, the fluid flows through and is compressed by a first one of the compressor units, then flows through and is compressed by a second one of the compressor units. In general, the compressor units in a parallel arrangement compress the fluid at a faster rate compared to the compressor units in a series arrangement. Alternatively, the compressor units in a series arrangement compress the fluid at a higher pressure compared to the compressor units in a parallel arrangement. As such, it may be advantageous to arrange the compressor units in parallel or in series depending on the application.

In examples disclosed herein, an example compression system can be configured for varying pressures by switching between parallel and series arrangements of the compressor units. In examples disclosed herein, a control valve (e.g., a three-way valve, etc.) is coupled between the pair of compressor units. The control valve can be operated to switch between the parallel arrangement and the series arrangement to direct the flow of the fluid accordingly. The control valve can be communicatively coupled to a computer system and/or a differential sensor implemented on the compression system. The differential pressure sensor is coupled between the fluid inlet and the fluid outlet to measure a differential pressure of the fluid across the compression system. In examples disclosed herein, the control valve can switch between the parallel arrangement and the series arrangement in response to the differential pressure satisfying a threshold. For example, in response to the differential pressure exceeding the threshold, the control valve can switch from the parallel arrangement to the series arrangement to accommodate a greater pressure of the fluid. In some examples, multiple pairs of the compressor units can be coupled in the compression system, including multiple ones of the control valves between each compressor unit and/or between each pair of compressor units. Advantageously, examples disclosed herein can be configured for different pressures and/or different compression rates of the fluid. Although the following systems and methods can apply to a variety of fluids, gas is used as an example in the following description.

FIG. 1A is a schematic illustration of a known fluid transfer and depressurization system (e.g., fluid transfer system) 100 used in connection with examples disclosed herein. The fluid transfer system 100 is configured to transport content (e.g., gas, other fluid) from a first location to a second location. The fluid transfer system 100 includes an example fluid intake 102 coupled to the first location and an example fluid outlet (e.g., fluid discharge) 104 coupled to the second location. Fluid (e.g., gas) is compressed by example compressor units 106A, 106B as the fluid flows from the fluid intake 102 to the fluid discharge 104. The compressor units 106A, 106B each include example gas pistons 108A, 108B implemented in example gas compression cylinders (e.g., compression cylinders) 110A, 110B, and an example air piston 112 implemented in an example air cylinder 114. The air cylinder 114 includes an example first chamber 116 and an example second chamber 118 coupled to an example air supply 120 via an example air control valve 122. The compression cylinders 110A, 110B include example third chambers 124A, 124B and example fourth chambers 126A, 126B coupled to the fluid intake 102 via inlet check valves 128A, and coupled to the fluid outlet via outlet check valves 128B.

In the illustrated example of FIG. 1A, gas enters via the fluid intake 102 and flows to the compressor units 106A, 106B via example piping 130. The gas enters the third chambers 124A, 124B and the fourth chambers 126A, 126B through the inlet check valves 128A. The inlet check valves 128A allow the gas to flow unidirectionally from the fluid intake 102 to the compressor units 106A, 106B. The air control valve 122 also directs compressed air from the air supply 120 to enter the air cylinder 114. The air control valve 122 can alternate flow of the compressed air between the first chamber 116 and the second chamber 118. In the illustrated example, the air control valve 122 directs compressed air into the first chamber 116 in response to a first switch 129A being engaged, and directs compressed air into the second chamber 118 in response to a second switch 129B being engaged, where the first switch 129A and the second switch 129B are operatively coupled to the air control valve 122. In other examples, the air control valve 122 can switch a direction of flow of the compressed air based on a command and/or a signal from a computer and/or other processor communicatively coupled to the air control valve 122.

In the illustrated example, an under-pressure cutoff 131 is coupled to the piping 130 between the fluid intake 102 and the air control valve 122. In some examples, the under-pressure cutoff 131 can detect whether a pressure of the fluid in the piping 130 drops below a threshold pressure (e.g., cutoff pressure). In response to the under-pressure cutoff 131 determining that the pressure of the fluid has dropped below the cutoff pressure, the under-pressure cutoff 131 can send an air signal to the air control valve 122 to shut off the flow of compressed air into the compressor units 106A, 106B and, as such, prevent the compressor units 106A, 106B from further compressing the fluid. In some examples, the under-pressure cutoff 131 is disabled (e.g., turned off) so that the compressor units 106A, 106B can continue to compress the fluid below the cutoff pressure. As such, disabling the under-pressure cutoff 131 allows the first location of the fluid to achieve a negative pressure and create a vacuum in the first location.

In the illustrated example of FIG. 1A, when the air control valve 122 directs the compressed air to flow into the first chamber 116, the compressed air generates pressure on the air piston 112 to move the air piston 112 to the right (e.g., towards the second compression cylinder 110B). The air piston 112 is operatively coupled to the gas pistons 108A, 108B via an example rod 132, such that the gas pistons 108A, 108B move with the air piston 112. In response to the air piston 112 moving to the right and, thus, the gas pistons 108A, 108B moving to the right, the gas in the fourth chambers 126A, 126B is compressed by the gas pistons 108A, 108B. Compressed gas is expelled from the fourth chambers 126A, 126B and flows through the respective outlet check valves 128B towards the fluid discharge 104. The outlet check valves 128B allow the gas to flow unidirectionally from the fluid intake 102 to the compressor units 106A, 106B.

When the air piston 112 is positioned to the right, the air piston 112 engages the second switch 129B coupled to the right side of the air cylinder 114. When the second switch 129B is engaged, the air control valve 122 stops the flow of compressed air to the first chamber 116 and directs the flow of compressed air to enter the second chamber 118. The compressed air from the first chamber 116 is expelled to the atmosphere via air exhaust tubing 134. In some examples, the compressed air from the first chamber 116 can be used to cool the compressed gas via an example heat exchanger 136 prior to the compressed air being expelled to the atmosphere.

In response to the air control valve 122 directing the flow of compressed air to enter the second chamber 118, the compressed air causes the air piston 112 and the gas pistons 108A, 108B to move to the left (e.g., toward the first compression cylinder 110A). The gas in the third chambers 124A, 124B is compressed by the gas pistons 108A, 108B. The compressed gas is expelled from the third chambers 124A, 124B and flows through the respective outlet check valves 128B towards the fluid discharge 104.

When the air piston 112 is positioned to the left, the air piston 112 engages the first switch 129A coupled to the left side of the air cylinder 114. When the first switch 129A is engaged, the air control valve 122 stops the flow of compressed air to the second chamber 118 and once again directs the flow of compressed air to enter the first chamber 116. In the illustrated example, the air control valve 122 continuously redirects the flow of compressed air between the first chamber 116 and the second chamber 118 to compress gas entering the third chambers 124A, 124B and the fourth chambers 126A, 126B. The above process repeats until the gas is evacuated from the first location (e.g., coupled to the fluid intake 102) and transferred to the second location (e.g., coupled to the fluid discharge 104).

Figure 1B:
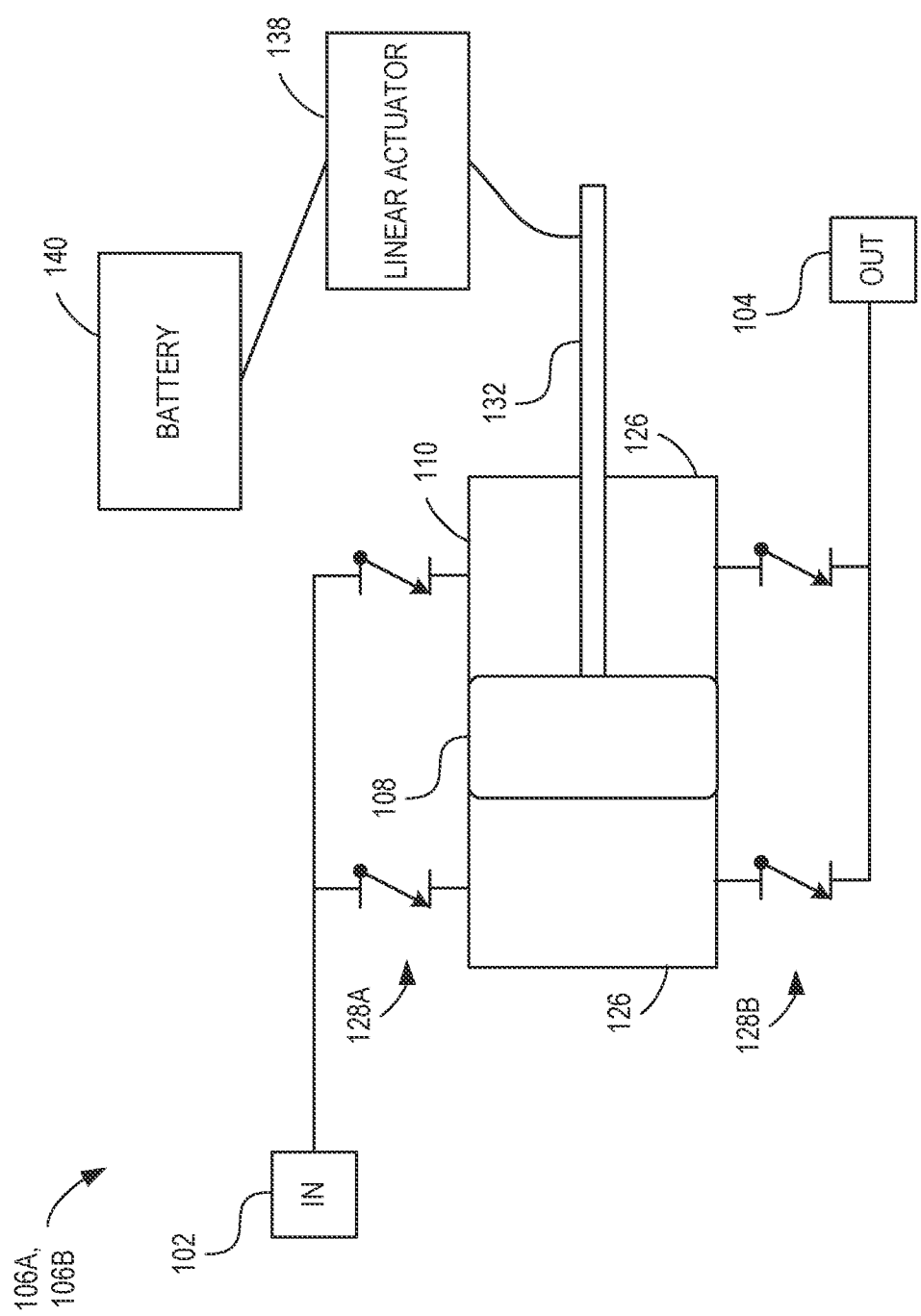
FIG. 1B illustrates example compressor units of FIG. 1A configured for electrical actuation.

FIG. 1B illustrates the compressor units 106A, 106B of FIG. 1A configured for electrical, rather than pneumatic, actuation. In such examples, gas from the fluid intake 102 of FIG. 1A is not compressed using compressed air from the air supply 120, but rather is compressed via an example linear actuator 138. As such, in this example, the fluid transfer system 100 does not include the air control valve 122, the air supply 120, and/or the air exhaust tubing 134 of FIG. 1A. The linear actuator 138 is coupled to and/or powered by an example battery 140.

In the illustrated example of FIG. 1B, the linear actuator 138 is operatively coupled to the rod 132 to move the gas piston 108 (e.g., the first gas piston 108A or the second gas piston 108B of FIG. 1A) inside the compression cylinder 110 (e.g., the first compression cylinder 110A or the second compression cylinder 110B of FIG. 1A). In this example, the linear actuator 138 is configured such that the gas piston 108 moves to the left when the linear actuator 138 extends, and the gas piston 108 moves to the right when the linear actuator 138 retracts. Alternatively, in other examples, the linear actuator 138 is configured such that the gas piston 108 moves to the left when the linear actuator 138 retracts, and the gas piston 108 moves to the right when the linear actuator 138 extends.

In this example, each of the compressor units 106A, 106B includes a single one of the gas pistons 108A, 108B and a corresponding one of the compression cylinders 110A, 110B. In such examples, each of the compressor units 106A, 106B includes corresponding ones of the linear actuator 138. In other examples, the linear actuator 138 can be coupled to both of the compressor units 106A, 106B to operate the compressor units 106A, 106B simultaneously. In other examples, the compressor units 106A, 106B can include both of the gas pistons 108A, 108B operated by the linear actuator 138.

In the illustrated example of FIG. 1B, in response to the linear actuator 138 moving the gas piston 108 to the right, the gas in the fourth chamber 126 is compressed by the gas piston 108. Compressed gas is expelled from the fourth chamber 126 and flows through the respective outlet check valves 128B towards the fluid discharge 104. Alternatively, in response to the linear actuator 138 moving the gas piston 108 to the left, the gas in the third chamber 124 is compressed by the gas piston 108. Compressed gas is expelled from the fourth chamber 126 and flows through the respective outlet check valves 128B towards the fluid discharge 104. In this example, the linear actuator 138 continuously moves between an extended position and a contracted position to compress gas entering the third chamber 124 and the fourth chamber 126 until the gas is evacuated from the first location (e.g., coupled to the fluid intake 102) and transferred to the second location (e.g., coupled to the fluid discharge 104).

Figure 1C:
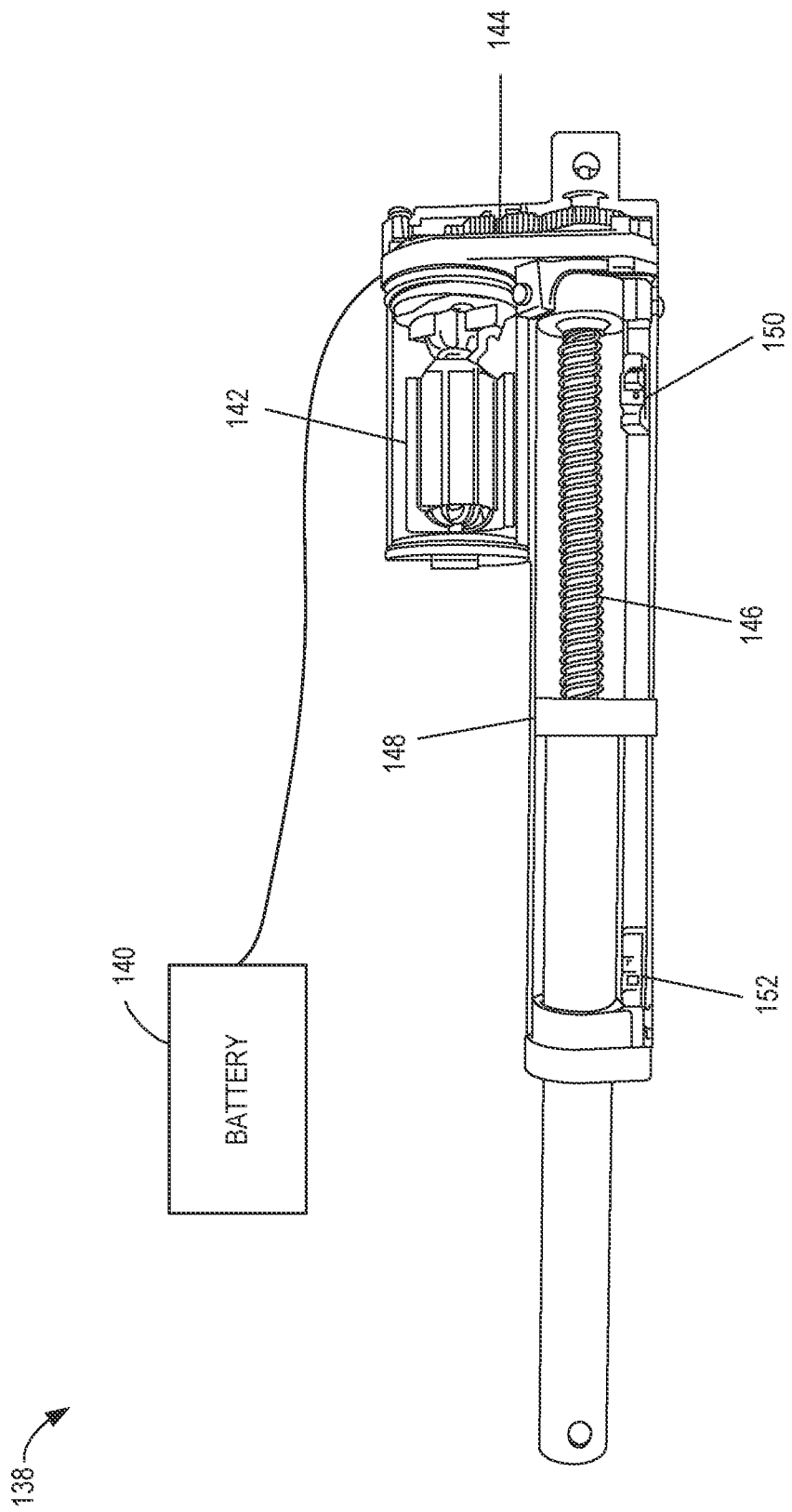
FIG. 1C illustrates a perspective view of the example linear actuator of FIG. 1B.

FIG. 1C illustrates a perspective view of the example linear actuator 138 of FIG. 1B. The example linear actuator 138 includes an example motor 142 coupled to the battery 140 of FIG. 1B, an example gear box 144, an example lead screw 146, an example drill nut 148, an example retract limit switch 150, and an example extend limit switch 152. In the illustrated example of FIG. 1C, rotation of the motor 142 causes corresponding rotation of the lead screw 146 via the gear box 144. The rotation of the lead screw 146 causes linear travel of the drill nut 148 along the lead screw 146 and, as such, causes the linear actuator 138 to extend or retract based on a direction of rotation of the motor 142 and/or the lead screw 146. For example, the linear actuator 138 extends in response to the motor 142 rotating in a first direction, and the linear actuator 138 retracts in response to the motor 142 rotating in a second direction, where the second direction is opposite from the first direction.

In the illustrated example of FIG. 1C, in response to the linear actuator 138 being fully extended, the drill nut 148 engages the extend limit switch 152. In such examples, the extend limit switch 152 sends a first electrical signal to the motor 142. In some examples, the first electrical signal causes the motor 142 to stop rotating and/or reverse the direction of rotation (e.g., from the first direction to the second direction). Alternatively, in response to the linear actuator 138 being fully retracted, the drill nut 148 engages the retract limit switch 150. In such examples, the retract limit switch 150 sends a second electrical signal to the motor 142. In some examples, where the first electrical signal causes the motor 142 to stop rotating and/or reverse the direction of rotation (e.g., from the second direction to the first direction). As such, repeatedly engaging the retract limit switch 150 and the extend limit switch 152 causes linear reciprocal travel of the linear actuator 138 to compress the gas in the compression cylinder 110 of FIG. 1B.

FIG. 2 illustrates the compressor units 106A, 106B of FIGS. 1A and/or 1B arranged in parallel. In the illustrated example of FIG. 2, gas flows from the fluid intake 102 of FIG. 1A to each of the compressor units 106A, 106B via example inlet piping 202. The inlet piping 202 directs gas flow into an example first compressor inlet 204A and an example second compressor inlet 204B such that the gas flows along two separate flow paths. The gas flows from the fluid intake 102 into the first compressor unit 106A via the first compressor inlet 204A, and the gas flows into the second compressor unit 106B via the second compressor inlet 204B. In response to the compressor units 106A, 106B compressing the gas, compressed gas exits the first compressor unit 106A via an example first compressor outlet 206A, and the compressed gas exits the second compressor unit 106B via an example second compressor outlet 206B. The gas from the second compressor outlet 206B joins the gas from the first compressor outlet 206A, and the compressed gas flows to the fluid discharge 104 via example outlet piping 208.

In the illustrated example of FIG. 2, each of the compressor units 106A, 106B has a maximum differential pressure of 200 pounds per square inch (psi). That is, each of the compressor units 106A, 106B can increase pressure of the gas flowing therein by 200 psi. In other examples, the maximum differential pressure across each of the compressor units 106A, 106B can be any other value (e.g., 100 psi, 300 psi, etc.). Additionally, in the illustrated example of FIG. 2, each of the compressor units 106A, 106B compresses the gas at a rate of compression of 1 actual cubic foot per minute (acfm). As such, when the compressor units 106A, 106B are arranged in parallel, a combined rate of compression of the gas through the compressor units 106A, 106B is 2 acfm. In other examples, the rate of compression for each of the compressor units 106A, 106B can be any other value (e.g., 2 acfm, 3 acfm, etc.). In some examples, the maximum differential pressure and/or the rate of compression for each of the compressor units 106A, 106B can be different.

Figure 3:
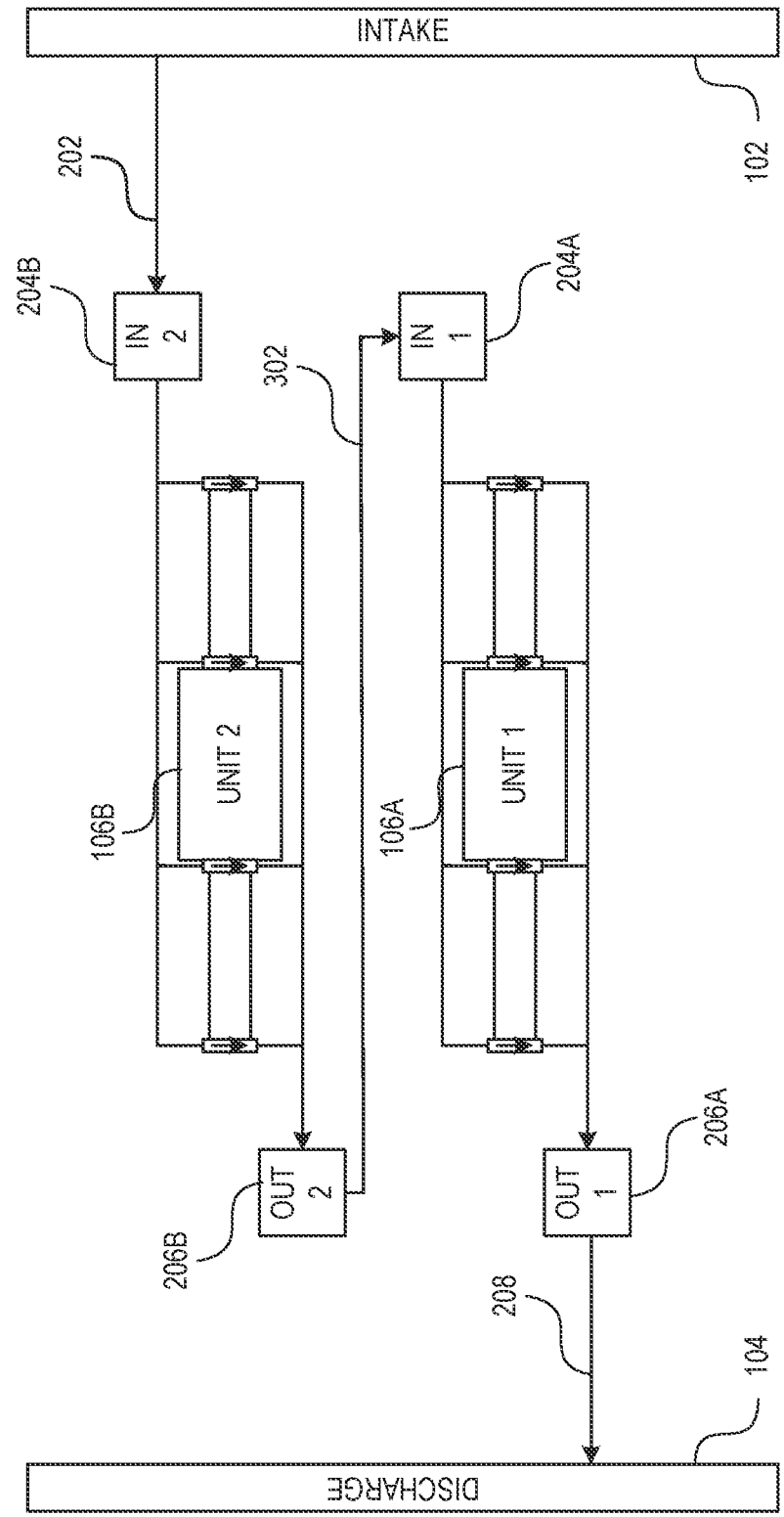
FIG. 3 illustrates the example compressor units of FIGS. 1A, 1B, and/or 2, where the compressor units are arranged in series.

FIG. 3 illustrates the compressor units 106A, 106B of FIGS. 1A and/or 1B arranged in series. In the illustrated example of FIG. 2, gas flows from the fluid intake 102 of FIG. 1A to the second compressor inlet 204B via the inlet piping 202 of FIG. 2. The gas is compressed by the second compressor unit 106B, then flows from the second compressor outlet 206B to the first compressor inlet 204A via example intermediate piping 302. In response to the gas being further compressed by the first compressor unit 106A, the compressed gas flows from the first compressor outlet 206A to the fluid discharge 104 via the outlet piping 208 of FIG. 2.

In the illustrated example of FIG. 3, in response to the compressor units 106A, 106B being arranged in series, the gas from the fluid intake 102 is compressed by each of the compressor units 106A, 106B before flowing to the fluid discharge 104. The gas in a series arrangement of the compressor units 106A, 106B flows along a single flow path. As such, the combined rate of compression of the gas is the rate of compression for an individual one of the compressor units 106A, 106B (e.g., 1 acfm, 2 acfm, etc.). Alternatively, in response to the gas being compressed by 200 psi by the first compressor unit 106A and further being compressed by 200 psi by the second compressor unit 106B, the maximum differential pressure of the gas between the fluid intake 102 and the fluid discharge 104 is a combined value of 400 psi, for example.

In the illustrated example of FIG. 3, the compressor units 106A, 106B arranged in series can compress the gas to a higher pressure compared to the compressor units 106A, 106B arranged in parallel as shown in FIG. 2. Alternatively, the compressor units 106A, 106B arranged in series compress the gas at a lower rate of compression compared to the compressor units 106A, 106B arranged in parallel. Typically, the fluid transfer system 100 of FIG. 1A can arrange the compressor units 106A, 106B either in series or in parallel. In such examples, different configurations of the fluid transfer system 100 are required for different applications depending on a desired differential pressure of the gas. In such examples, each configuration of the fluid transfer system 100 can compress the gas to a different pressure based on a size, number, and arrangement of the compressor units 106A, 106B therein. For example, a measured differential pressure between the fluid intake 102 and the fluid discharge 104 can be used to select a parallel configuration in response to the measured differential pressure being less than a threshold value, or a series configuration in response to the measured differential pressure being greater than the threshold value. Selecting the configuration of the compressor units 106A, 106B is described further in connection with FIG. 4 below.

Figure 4:
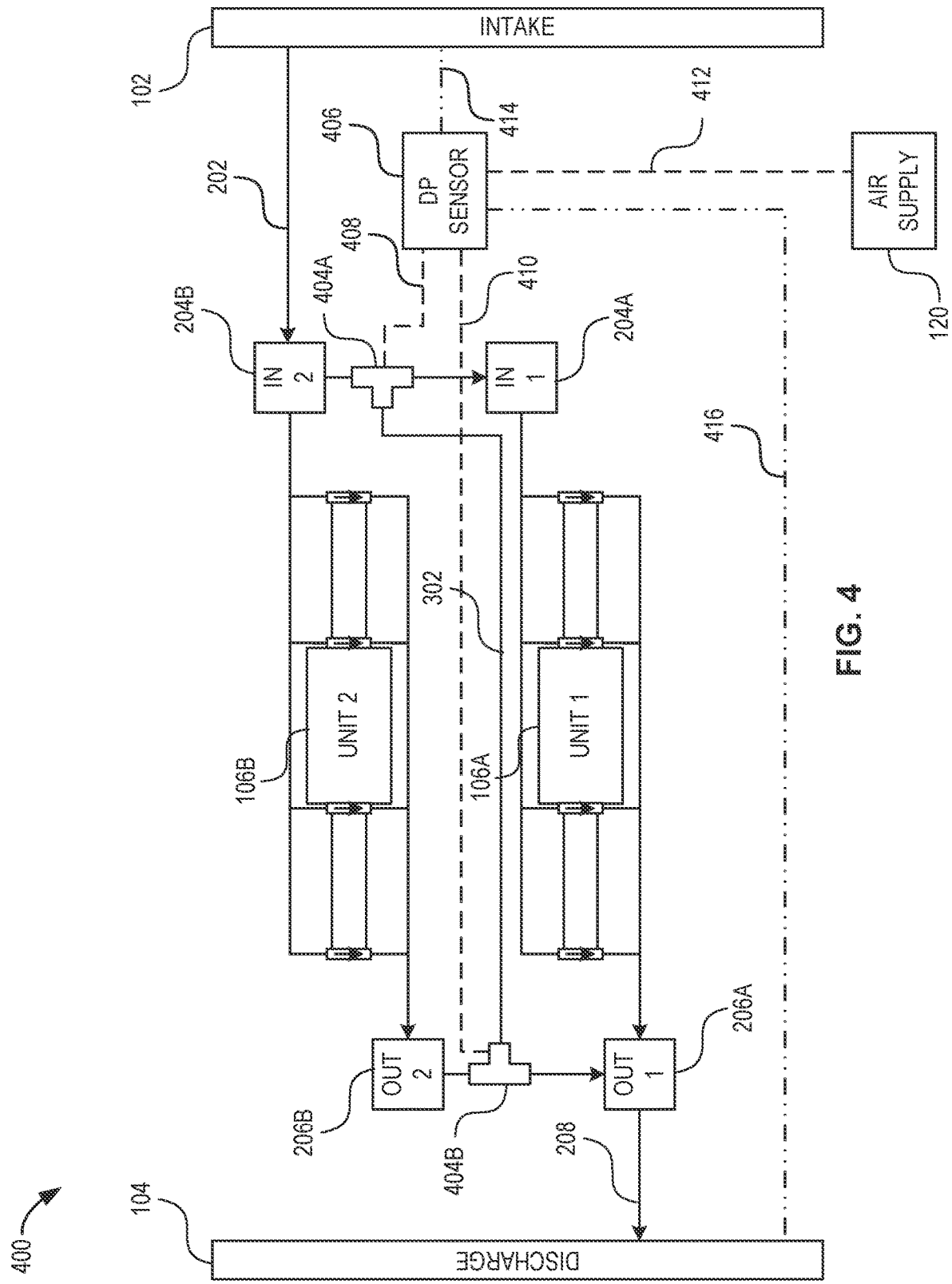
FIG. 4 illustrates an example configurable pressure compression system in accordance with the teachings of this disclosure.

FIG. 4 illustrates an example configurable pressure compression system (e.g., system) 400 in accordance with the teachings of this disclosure. The example configurable pressure compression system 400 includes the example compressor units 106A, 106B of FIGS. 1, 2, and/or 3, an example first control valve (e.g., valve) 404A, an example second control valve 404B, and an example differential pressure sensor (e.g., sensor) 406 coupled between the fluid intake 102 and the fluid discharge 104 and further coupled to the example air supply 120 of FIG. 1A.

In the illustrated example of FIG. 4, the control valves 404A, 404B can control a direction of flow of the gas to and/or from the compressor units 106A, 106B. The control valves 404A, 404B can switch between a first state and a second state, in which the control valves 404A, 404B direct the gas flow in a parallel arrangement in the first state and in a series arrangement in the second state. In some examples, the control valves 404A, 404B can switch to a third state in which the control valves 404 prevent gas from flowing to the first compressor unit 106A, causing the configurable pressure compression system 400 to effectively function as a one-unit system. The control valves 404A, 404B switch between the first state and the second state based on a differential pressure across the compressor units 106A, 106B.

Figure 5A:
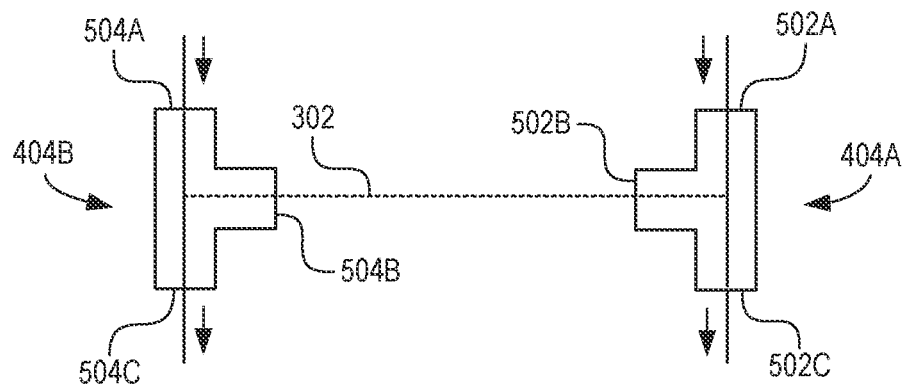
FIG. 5A illustrates the example control valves of FIG. 4 configured in a first state representing a parallel arrangement.
Figure 5B:
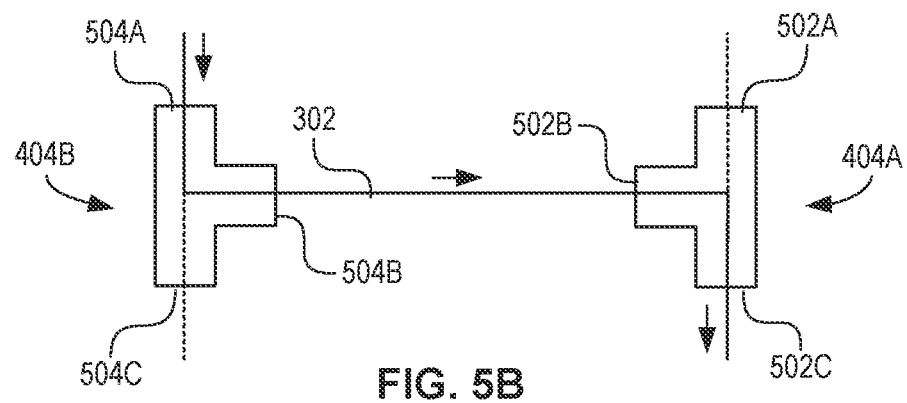
FIG. 5B illustrates the example control valves of FIG. 4 configured in a second state representing a series arrangement.
Figure 5C:
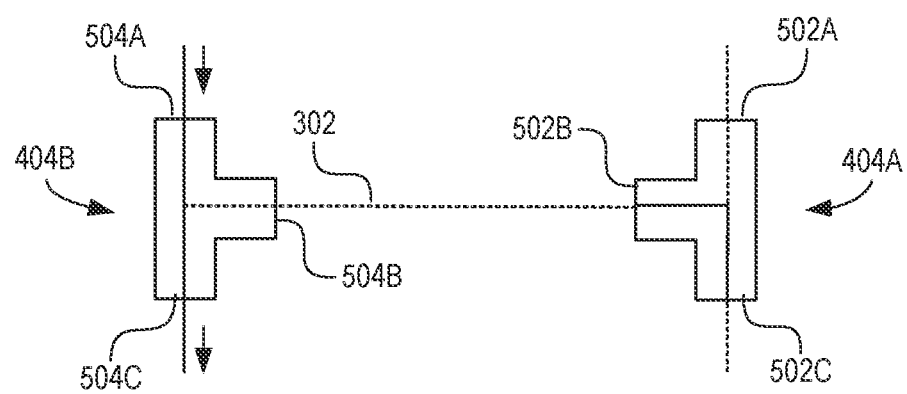
FIG. 5C illustrates the example control valves of FIG. 4 configured in a third state.

FIGS. 5A, 5B, and 5C illustrate the example control valves 404A, 404B of FIG. 4 in the first state, the second state, and the third state, respectively. The control valves 404A, 404B are three-way valves, where each valve can switch between two different flow paths. In some examples, the control valves 404A, 404B are air-driven valves that can switch from the first state to the second state in response to a flow of compressed air to the control valves 404A, 404B. The example first control valve 404A includes an example first port 502A, an example second port 502B, and an example third port 502C. Similarly, the example second control valve 404B includes an example first port 504A, an example second port 504B, and an example third port 504C.

In the illustrated example of FIG. 5A, the control valves 404A, 404B are in the first state, in which the gas flows in a parallel arrangement through the compressor units 106A, 106B. In the first state, the first port 502A and the third port 502C of the first control valve 404A are open, and the second port 502B of the first control valve 404A is closed. Additionally, in the first state, the first port 504A and the third port 504C of the second control valve 404B are open, and the second port 504B of the second control valve 404B is closed.

In the illustrated example of FIG. 5A, the gas can flow from the second compressor outlet 206B to the first compressor outlet 206A via the second control valve 404B. For example, the gas enters the first control valve 404B via the first port 504A and exits via the third port 504C. In such examples, in response to the second port 504B of the second control valve 404B being closed, the second port 504B prevents the gas from flowing through the intermediate piping 302. Additionally, the gas can flow from the fluid intake 102 and the second compressor inlet 204B to the first compressor inlet 204A via the first control valve 404A. For example, the gas enters the first control valve 404A via the first port 502A and exits via the third port 502C. In such examples, in response to the second port 502B of the first control valve 404A being closed, the second port 502B prevents the gas from flowing through the intermediate piping 302.

Turning to the illustrated example of FIG. 5B, the control valves 404A, 404B are in the second state, where the gas flows in a series arrangement through the compressor units 106A, 106B. In the second state, the second port 502B and the third port 502C of the first control valve 404A are open, and the first port 502A of the first control valve 404A is closed. Additionally, in the second state, the first port 504A and the second port 504B of the second control valve 404B are open, and the third port 504C of the second control valve 404B is closed.

In the illustrated example of FIG. 5B, the gas can flow from the second compressor outlet 206B to the first compressor inlet 204A via the intermediate piping 302 coupled between the first control valve 404A and the second control valve 404B. For example, the gas enters the second control valve 404B via the first port 504A and exits via the second port 504B. In such examples, in response to the third port 504C of the second control valve 404B being closed, the third port 504C prevents the gas from flowing to the fluid discharge 104 via the first compressor outlet 206A. In response to exiting the second control valve 404B, the gas enters the first control valve 404A via the second port 502B and exits via the third port 502C. In such examples, in response to the first port 502A of the first control valve 404A being closed, the first port 502A prevents the gas from flowing from the fluid intake 102 and/or from the second compressor inlet 204B.

In the illustrated example of FIG. 5C, the control valves 404 are in the third state, in which the gas flows through the first compressor unit 106A and not through the second compressor unit 106B. In some examples, the control valves 404 is manually configured in the third state during maintenance and/or testing procedures on the first compressor unit 106A and/or the second compressor unit 106B. In the third state, the first port 502A and the second port 502B of the first valve 502 are open, and the third port 502C of the first valve 502 is closed. Additionally, in the third state, the first port 504A and the third port 504C of the second valve 504 are open, and the second port 504B of the second valve 504 is closed.

In the illustrated example of FIG. 5C, the gas can flow from the second compressor unit 106B to the fluid discharge 104 via the second control valve 404B. For example, the gas enters the second control valve 404B via the first port 504A and exits via the third port 504C. In such examples, in response to the second port 504B of the second control valve 404B being closed, the second port 504B prevents the gas from flowing through the intermediate piping 302. Additionally, the first port 502A of the first control valve 404A is closed to prevent gas from flowing from the fluid intake 102 and/or the second compressor inlet 204B to the first compressor inlet 204A. In such examples, only the second compressor unit 106B is being used to compress the gas.

Figure 6B:
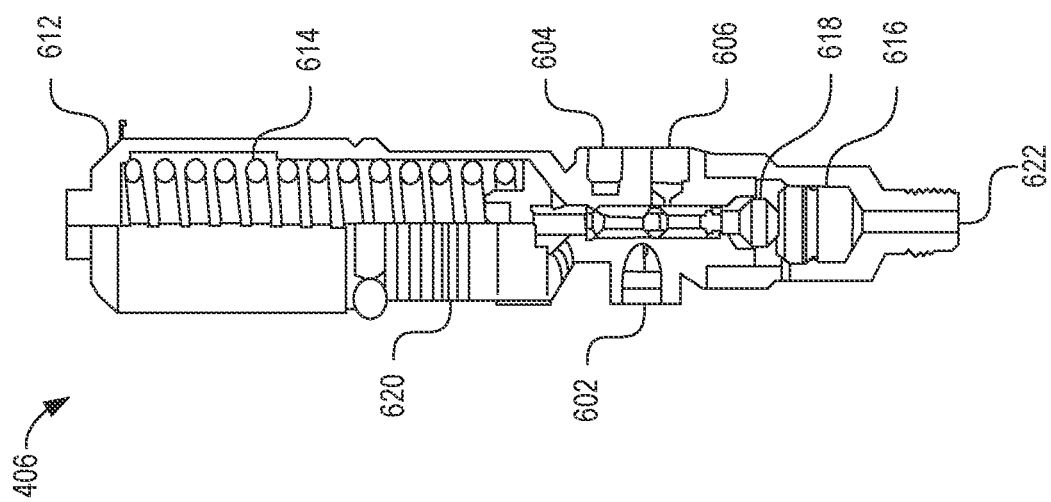
FIG. 6B illustrates the example differential pressure sensor of FIG. 6A in a perspective view.
Figure 6A:
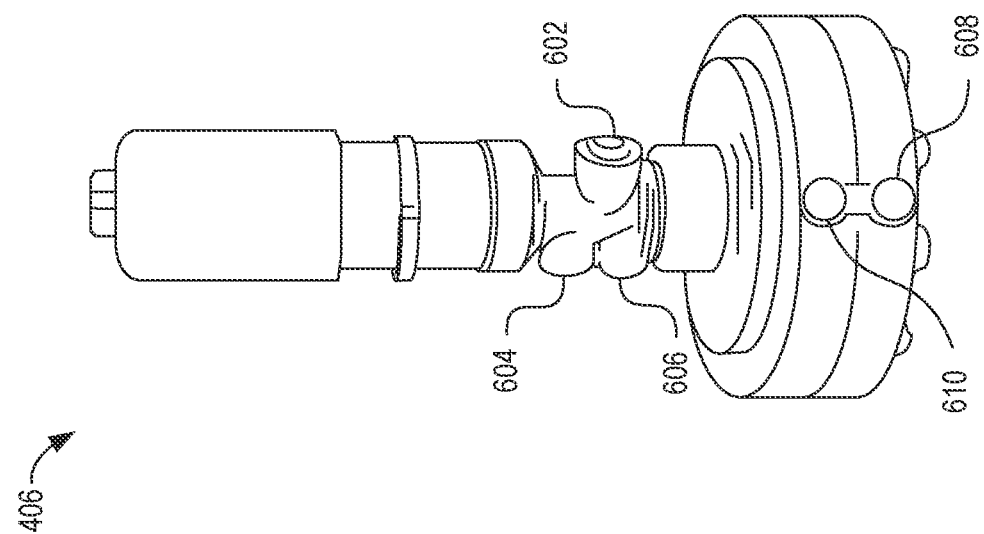
FIG. 6A illustrates an example differential pressure sensor in a front view.

FIGS. 6A and 6B illustrate the example differential pressure sensor 406 of FIG. 4 in a front view and a perspective view, respectively. In the illustrated example of FIG. 6A, the differential pressure sensor 406 includes an instrument pressure outlet 602, a high pressure port 604, a low pressure port 606, a sensor fluid inlet 608, and a sensor fluid outlet 610.

In FIG. 6A, fluid from the example fluid intake 102 of FIG. 4 enters the sensor fluid inlet 610 during operation of the example configurable pressure compression system 400 of FIG. 4. The air supply 120 of FIG. 1A is coupled to the low pressure port 606. In response to a pressure of the fluid exceeding a threshold pressure, air from the air supply 120 is directed from the low pressure port 606 to the instrument pressure outlet 602.

In the illustrated example of FIG. 6B, the differential pressure sensor 406 includes the instrument pressure outlet 602, the high pressure port 604, and the low pressure port 606, and further includes an adjustment cap 612, a spring 614, and a piston 616 coupled to a stem 618.

In FIG. 6B, the adjustment cap 612 can be used to change a spring force of the spring 614 and, in turn, control the threshold pressure of the differential pressure sensor 406. For example, the adjustment cap 612 can be moved up or down by manually twisting the adjustment cap 612 along an example threaded portion 620. Turning the adjustment cap 612 clockwise causes the adjustment cap 612 to move downward on the threaded portion 620 to further compress the spring 614 and increase the spring force. Alternatively, turning the adjustment cap 612 counterclockwise causes the adjustment cap 612 to move upward on the threaded portion 620 to reduce compression of the spring 614 and, in turn, reduce the spring force. Increasing the spring force causes an increase in the threshold pressure, whereas reducing the spring force causes a reduction in the threshold pressure.

The fluid flowing between the sensor fluid inlet 608 and the sensor fluid outlet 610 enters an example line pressure port 622 and generates a force on the piston 616. When the pressure of the fluid is below the threshold pressure, the spring force of the spring 614 causes the piston 616 to remain in a relatively downward position and prevents air in the low pressure port 606 from flowing to the instrument pressure outlet 602. Alternatively, when the pressure of the fluid is greater than the threshold pressure, the force generated by the fluid on the piston 616 overcomes the spring force of the spring 614 and causes the piston 616 to move upward.

Returning to FIG. 4, the differential pressure sensor 406 is fluidly coupled to the first control valve 404A via example first air piping 408, and is fluidly coupled to the second control valves 404B via example second air piping 410. The first air piping 408 and the second air piping 410 are coupled to the instrument pressure outlet 602 of FIGS. 6A and/or 6B. The air supply 120 is fluidly coupled to the low pressure port 606 of the differential pressure sensor 406 via example air inlet piping 412. As such, air from the air supply 120 can flow via the air inlet piping 416, the first air piping 408, and/or the second air piping 410 to control each of the control valves 404. Additionally, system fluid (e.g., gas) from the fluid intake 102 flows to the differential pressure sensor 406 via example sensor inlet piping 412, and flows from the differential pressure sensor 406 via example sensor outlet piping 414.

As fluid flows through the differential pressure sensor 406 from the fluid intake 102 to the fluid discharge 104, the fluid engages the piston 616 of FIG. 6B. When the pressure of the fluid between the fluid intake 102 and the fluid discharge 104 exceeds the threshold pressure (e.g., 200 psi) of the differential pressure sensor 406, the piston 616 is pushed upward by fluid pressure. In response to the piston 616 moving upward, the air from the air supply 120 can flow through the first air piping 408 and the second air piping 410 to the control valves 404. The air causes the control valves 404 to switch from the first state of FIG. 5A to the second state of FIG. 5B, causing the configurable pressure compression system 400 to function as a series configuration. In such examples, the compressor units 106A, 106B in the series configuration can operate at an increased pressure compared to the parallel configuration.

Alternatively, in response to the pressure of the fluid dropping below the threshold pressure, the spring force of the spring 614 of FIG. 6B is greater than the force generated by the fluid and, as such, the spring 614 causes the piston 616 to move relatively downward. The piston 616 blocks the air flowing to the control valves 404 and, as such, the control valves 404 switch from the second state to the first state, causing the configurable pressure compression system 400 to return to a parallel configuration. In such examples, the compressor units 106A, 106B in the parallel configuration can operate at an increased flow rate and/or rate of compression compared to the series configuration.

FIG. 7 illustrates an example status table 700 for the example compressor units 106A, 106B of FIGS. 1, 2, 3, and/or 4 for each state of the example control valves 404. In the example status table 700, an example state column 702 corresponds to the state of the control valves 404 (e.g., the first state, the second state, and/or the third state), an example first unit column 704 corresponds to the status of the first compressor unit 106A, and an example second unit column 706 corresponds to the status of the second compressor unit 106B. Each of the compressor units 106A, 106B is considered active when the gas is flowing through and/or is compressed by the respective compressor unit 106A, 106B, as is considered inactive when the gas is not flowing through and/or is not being compressed by the respective compressor unit 106A, 106B.

In the illustrated example of FIG. 7, in response to the control valves 404 being in the first state (e.g., corresponding to the parallel arrangement), both the compressor units 106A, 106B are active. Similarly, in response to the control valves 404 being in the second state (e.g., corresponding to the series arrangement), both the compressor units 106A, 106B are active. In response to the control valves being in the third state, the first compressor unit 106A is inactive and the second compressor unit 106B is active.

Figure 8:
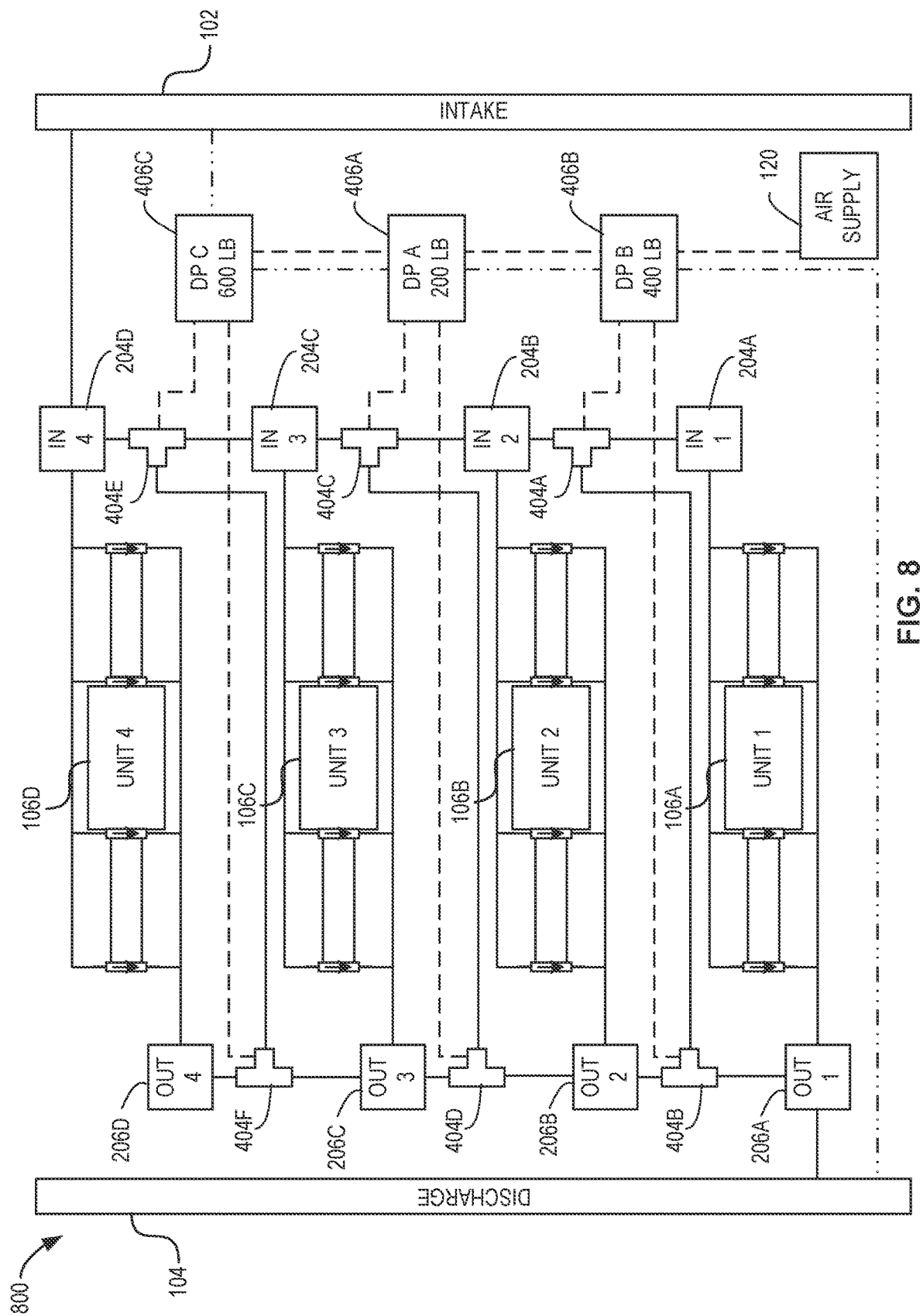
FIG. 8 illustrates a first example four-compressor system including the example compressor units of FIGS. 1A, 1B, 2, 3, and/or 4.

FIG. 8 illustrates a first example four-compressor system 800 including the example compressor units 106A, 106B of FIGS. 1, 2, 3, and/or 4. In the illustrated example of FIG. 8, the first four-compressor system 800 further includes an example third compressor unit 106C and an example fourth compressor unit 106D. The third compressor unit 106C and the fourth compressor unit 106D are coupled in the same manner as the first compressor unit 106A and the second compressor unit 106B illustrated in FIG. 4. The first four-compressor system 800 includes multiple ones of the control valves 404 of FIGS. 4, 5A, 5B, and/or 5C, including the example first control valve 404A, the example second control valve 404B, an example third control valve 404C, an example fourth control valve 404D, an example fifth control valve 404E, and an example sixth control valve 404F. The third control valve 404C and the fourth control valve 404D are fluidly coupled to an example first differential pressure sensor 406A, the first control valve 404A and the second control valve 404B are fluidly coupled to an example second differential pressure sensor 406B, and the fifth control valve 404E and the sixth control valve 404F are fluidly coupled to an example third differential pressure sensor 406C.

In the illustrated example of FIG. 8, the first compressor unit 106A is fluidly coupled between the first compressor inlet 204A and the first compressor outlet 206A of FIGS. 2, 3, and/or 4, the second compressor unit 106B is fluidly coupled between the second compressor inlet 204B and the second compressor outlet 206B of FIGS. 2, 3, and/or 4, the third compressor unit 106C is fluidly coupled between an example third compressor inlet 204C and an example third compressor outlet 206C, and the fourth compressor unit 106D is fluidly coupled between an example fourth compressor inlet 204D and an example fourth compressor outlet 206D.

Each of the differential pressure sensors 406 measures a differential pressure of the fluid flowing between the fluid intake 102 and the fluid discharge 104. Further, the differential pressure sensors 406 direct compressed air from the air supply 120 to the corresponding control valves 404 to switch the control valves 404 between the first state and the second state. In the illustrated example, the first differential pressure sensor 406A has a first pressure threshold of 200 psi, the second differential pressure sensor 406B has a second pressure threshold of 400 psi, and the third differential pressure sensor 406C has a third pressure threshold of 600 psi. In some examples, the first pressure threshold, the second pressure threshold, and/or the third pressure threshold can be a different value. In the illustrated example of FIG. 8, in response to the differential pressure of the fluid being at or above 200 psi, the first differential pressure sensor 406A switches the third control valve 404C and the fourth control valve 404D from the first state to the second state. Additionally, in response to the differential pressure of the fluid being at or above 400 psi, the second differential pressure sensor 406B switches the first control valve 404A and the second control valve 404B from the first state to the second state. In some examples, in response to the differential pressure of the fluid being at or above 400 psi, the second differential pressure sensor 406B switches the first control valve 404A and the second control valve 404B from the first state to the second state.

In some examples, multiple ones of the compressor units 106A-106D and multiple ones of the control valves 404 can be implemented to generate a multi-compressor system (e.g., a six-compressor system, an eight-compressor system, etc.). In some examples, up to sixteen of the compressor units 106A-106D can be used.

Figure 9A:
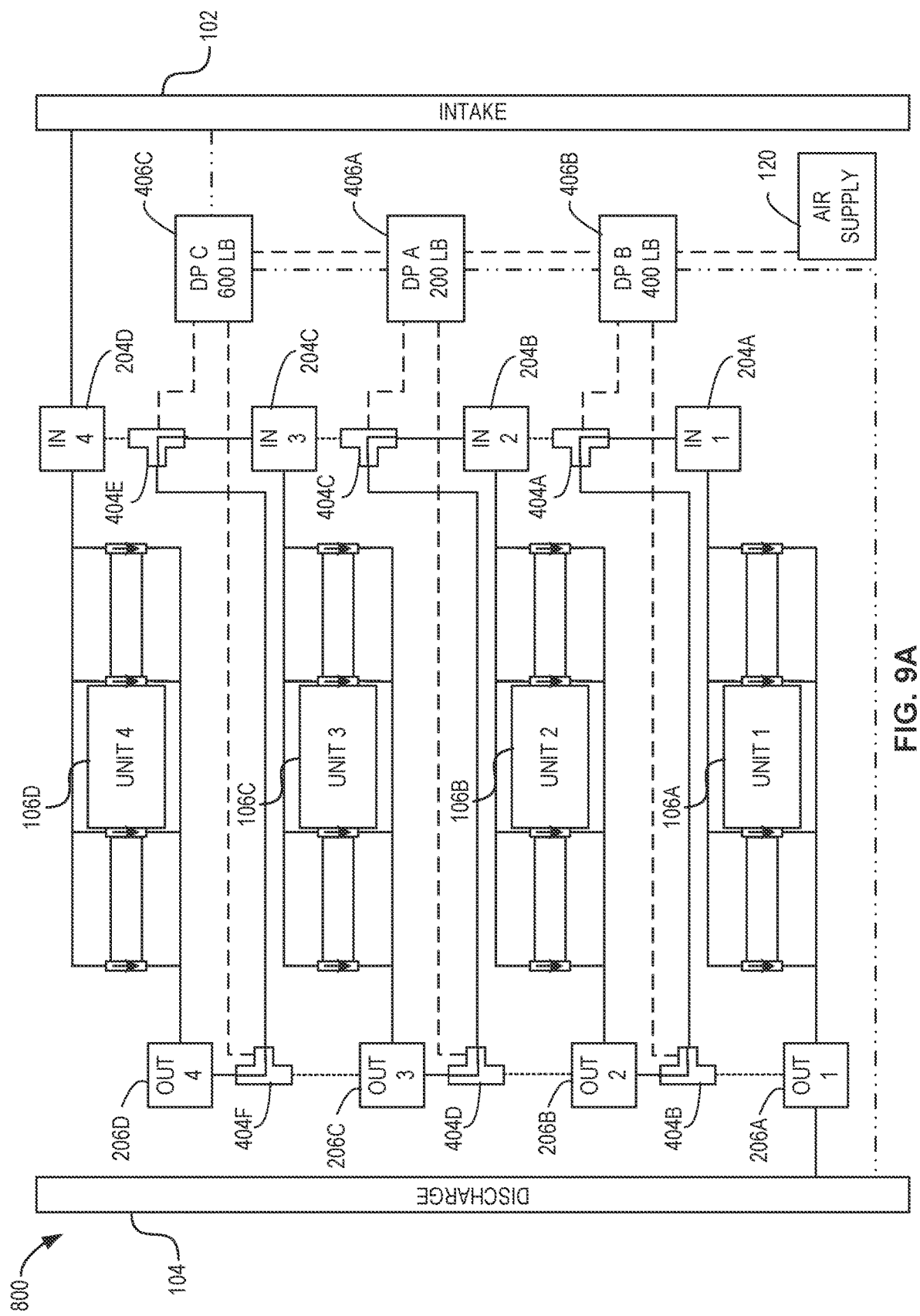
FIG. 9A illustrates the first example four-compressor system of FIG. 8 when the compressor system is turned off.

FIG. 9A illustrates the first four-compressor system 800 of FIG. 8 in a state or mode occurring when the first four-compressor system 800 is turned off (e.g., no fluid is flowing between the fluid intake 102 and the fluid discharge 104). In the illustrated example of FIG. 9A, the air supply 120 is shut off so that no air is flowing to the differential pressure sensors 406. As such, the differential pressure sensors 406 do not switch the control valves 404 between the first state and the second state while the first four-compressor system 800 is turned off (e.g., de-energized). In some examples, the control valves 404 remain in the second state until the first four-compressor system 800 and/or the air supply 120 is/are turned on.

Figure 9B:
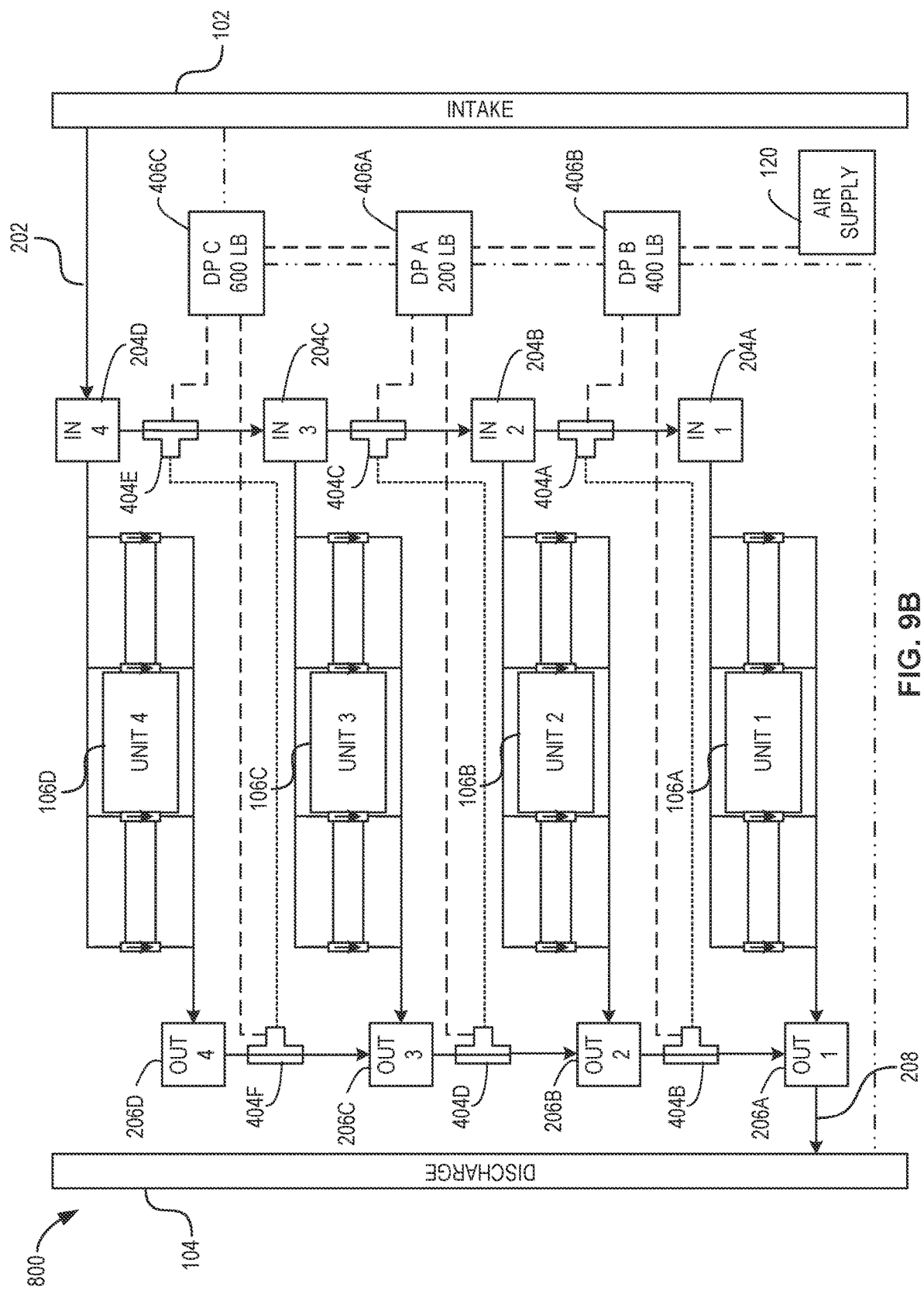
FIG. 9B illustrates the first example four-compressor system of FIG. 8 when the four-compressor system is turned on so that fluid can flow from a fluid intake to a fluid discharge.

FIG. 9B illustrates the first four-compressor system 800 of FIG. 8 in a state or mode occurring when the first four-compressor system 800 is turned on so that fluid can flow from the fluid intake 102 to the fluid discharge 104. Additionally, the air supply 120 is turned on so that compressed air can flow from the air supply 120 to the differential pressure sensors 406. In response to the first four-compressor system 800 being turned on, the control valves 404 are switched from the second state to the first state so that all four of the compressor units 106 are arranged in parallel. In the illustrated example of FIG. 9B, differential pressure of the fluid is approximately 0 psi, so that the differential pressure is less than the first pressure threshold corresponding to the first differential pressure sensor 406A.

In FIG. 9B, fluid flows from the fluid intake 102 to the fourth compressor inlet 204D via the inlet piping 202. Fluid further flows from the fourth compressor inlet 204D to the third compressor inlet 204C via the fifth control valve 404E, from the third compressor inlet 204C to the second compressor inlet 204B via the third control valve 404C, and from the second compressor inlet 204B to the first compressor inlet 204A via the first control valve 404A. Additionally, the fluid flowing from the fourth compressor inlet 204D to the fourth compressor outlet 206D is compressed by the fourth compressor unit 106D, the fluid flowing from the third compressor inlet 204C to the third compressor outlet 206C is compressed by the third compressor unit 106C, the fluid flowing from the second compressor inlet 204B to the second compressor outlet 206B is compressed by the second compressor unit 106B, and the fluid flowing from the first compressor inlet 204A to the first compressor outlet 206A is compressed by the first compressor unit 106A. The fluid from the fourth compressor outlet 206D, the third compressor outlet 206C, and the second compressor outlet 206B flows to the first compressor outlet 206A via the sixth control valve 404F, the fourth control valve 404D, and the second control valve 404B, respectively. The fluid exits the first compressor outlet 206A via the outlet piping 208 to the fluid discharge 104.

In the illustrated example of FIG. 9B, fluid can flow from the fluid intake 102 to the fluid discharge 104 along one of four flow paths corresponding to each of the compressor units 106. In the illustrated example of FIG. 9B, each of the compressor units 106 compresses the fluid by 200 psi with a rate of compression of 1 acfm. As such, the first four-compressor system 800 in the configuration of FIG. 9B can compress the fluid by a combined pressure of 200 psi and a combined rate of compression of 4 acfm. In some examples, one or more of the compressor units 106 can have a different pressure and/or rate of compression.

Figure 9C:
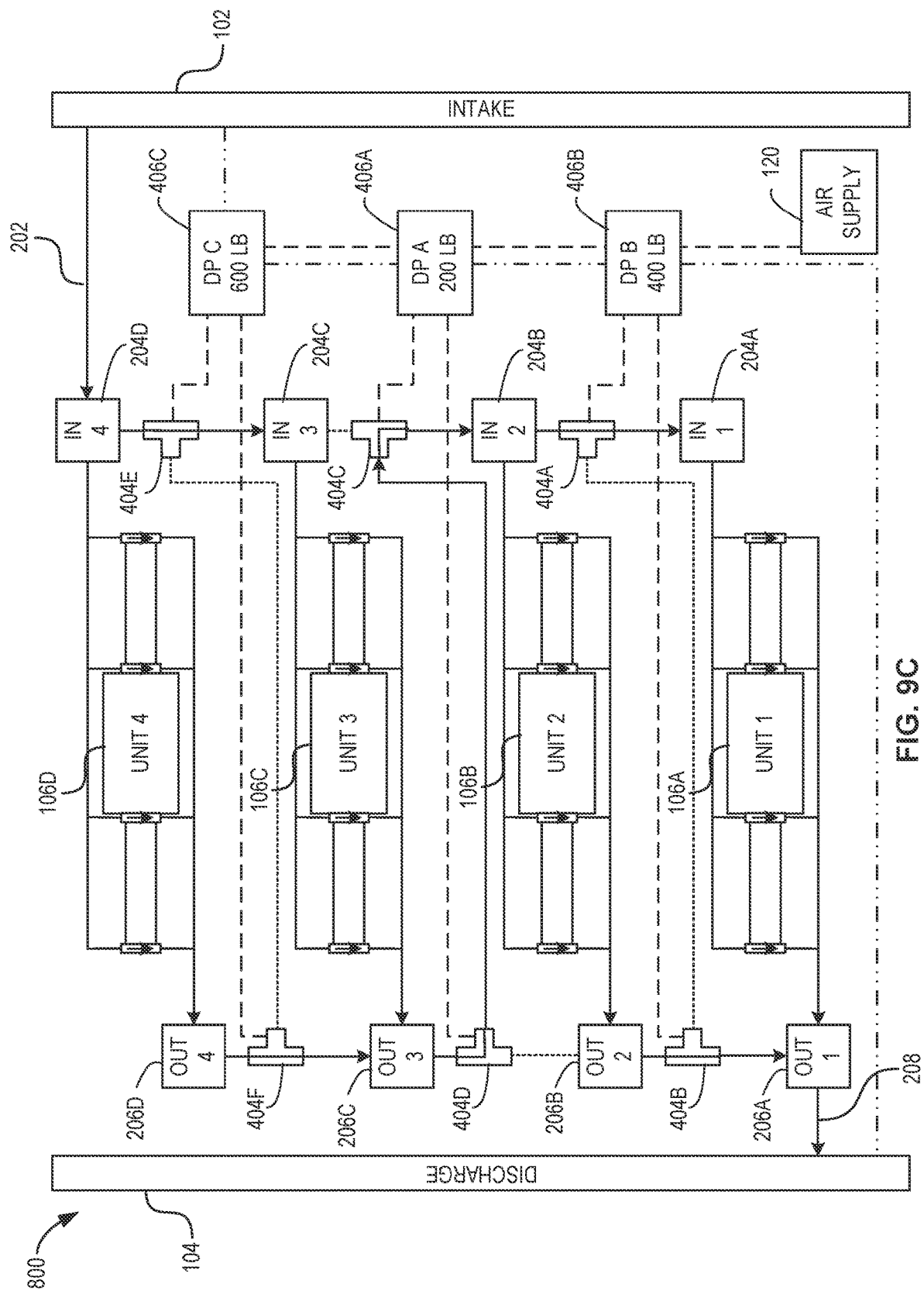
FIG. 9C illustrates the first example four-compressor system of FIG. 8 in which fluid flowing from the fluid intake to the fluid discharge reaches a first differential pressure.

FIG. 9C illustrates the first four-compressor system 800 of FIG. 8 operating in a state or mode in which fluid flowing from the fluid intake 102 to the fluid discharge 104 reaches a differential pressure of 200 psi. In response to the first differential pressure sensor 406A measuring the 200 psi differential pressure of the fluid, the first differential pressure sensor 406A directs compressed air from the air supply 120 to the third control valve 404C and the fourth control valve 404D. In response to receiving the compressed air, the third control valve 404C and the fourth control valve 404D switch from the first state to the second state. As such, the third control valve 404C prevents the fluid from flowing between the third compressor inlet 204C and the second compressor inlet 204B, and the fourth control valve 404D prevents the fluid from flowing between the third compressor outlet 206C and the second compressor outlet 206B.

In FIG. 9C, fluid flows from the fluid intake 102 to the fourth compressor inlet 204D via the inlet piping 202. The fluid further flows from the fourth compressor inlet 204D to the fourth compressor outlet 206D via the fourth compressor unit 106D, or flows from the fourth compressor inlet 204D to the third compressor inlet 204C via the fifth control valve 404E and to the third compressor outlet 206C via the third compressor unit 106C. Additionally, the fluid flowing from the fourth compressor outlet 206D flows to the third compressor outlet 206C to join the fluid having been compressed by the third compressor unit 106C. The fluid then flows from the third compressor outlet 206C to the second compressor inlet 204B via the fourth control valve 404D and the third control valve 404C. The fluid further flows from the second compressor inlet 204B to the second compressor outlet 206B via the second compressor unit 106B, or flows from the second compressor inlet 204B to the first compressor inlet 204A via the first control valve 404A and to the first compressor outlet 206A via the first compressor unit 106A. The fluid exits the first compressor outlet 206A via the outlet piping 208 to the fluid discharge 104.

In the illustrated example of FIG. 9C, the first compressor unit 106A and the second compressor unit 106B are arranged in parallel, the third compressor unit 106C and the fourth compressor unit 106D are arranged in parallel, and the first compressor unit 106A and the second compressor unit 106B are arranged in series with the third compressor unit 106C and the fourth compressor unit 106D. As such, the fluid flowing between the fluid intake 102 and the fluid discharge 104 is compressed by 200 psi by either the third compressor unit 106C or the fourth compressor unit 106D, and is further compressed by 200 psi by either the first compressor unit 106A or the second compressor unit 106B. Accordingly, the first four-compressor system 800 in the configuration of FIG. 9C can compress the fluid by a combined pressure of 400 psi and a combined rate of compression of 2 acfm.

Figure 9D:
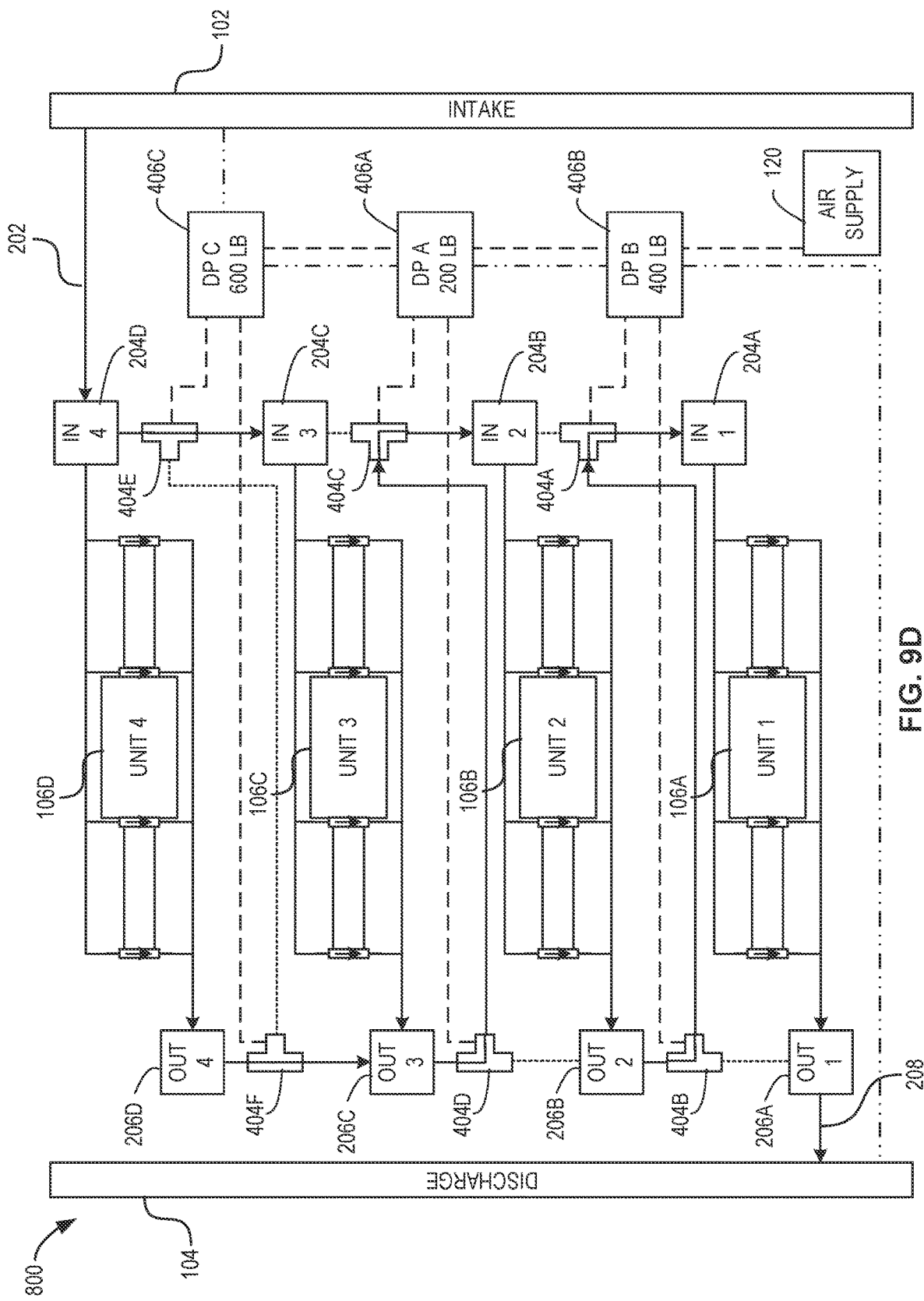
FIG. 9D illustrates the first example four-compressor system of FIG. 8 in which fluid flowing from the fluid intake to the fluid discharge reaches a second differential pressure.

FIG. 9D illustrates the first four-compressor system 800 of FIG. 8 in a state or mode in which fluid flowing from the fluid intake 102 to the fluid discharge 104 reaches a differential pressure of 400 psi. In response to measuring the 400 psi differential pressure of the fluid, the second differential pressure sensor 406B directs compressed air from the air supply 120 to the first control valve 404A and the second control valve 404B. In response to receiving the compressed air, the first control valve 404A and the second control valve 404B switch from the first state to the second state. As such, the first control valve 404A prevents the fluid from flowing between the second compressor inlet 204B and the first compressor inlet 204A, and the second control valve 404B prevents the fluid from flowing between the second compressor outlet 206B and the first compressor outlet 206A.

In FIG. 9D, fluid flows from the fluid intake 102 to the fourth compressor inlet 204D via the inlet piping 202. The fluid further flows from the fourth compressor inlet 204D to the fourth compressor outlet 206D via the fourth compressor unit 106D, or flows from the fourth compressor inlet 204D to the third compressor inlet 204C via the fifth control valve 404E and to the third compressor outlet 206C via the third compressor unit 106C. Additionally, the fluid flowing from the fourth compressor outlet 206D flows to the third compressor outlet 206C to join the fluid having been compressed by the third compressor unit 106C. The fluid then flows from the third compressor outlet 206C to the second compressor inlet 204B via the fourth control valve 404D and the third control valve 404C. The fluid further flows from the second compressor inlet 204B to the second compressor outlet 206B via the second compressor unit 106B, then flows from the second compressor outlet 206B to the first compressor inlet 204A via the second control valve 404B and the first control valve 404A. The fluid flows from the first compressor inlet 204A to the first compressor outlet 206A via the first compressor unit 106A, then exits the first compressor outlet 206A via the outlet piping 208 to the fluid discharge 104.

In the illustrated example of FIG. 9D, the third compressor unit 106C and the fourth compressor unit 106D are arranged in parallel, while the first compressor unit 106A and the second compressor unit 106B are arranged in series and further arranged in series with the third compressor unit 106C and the fourth compressor unit 106D. As such, the fluid flowing between the fluid intake 102 and the fluid discharge 104 is compressed by 200 psi by either the third compressor unit 106C or the fourth compressor unit 106D, then compressed by 200 psi by the second compressor unit 106B, and further compressed by 200 psi by the first compressor unit 106A. Accordingly, the first four-compressor system 800 in the configuration of FIG. 9D can compress the fluid up to a combined pressure of 600 psi and a combined rate of compression of 1 acfm.

Figure 9E:
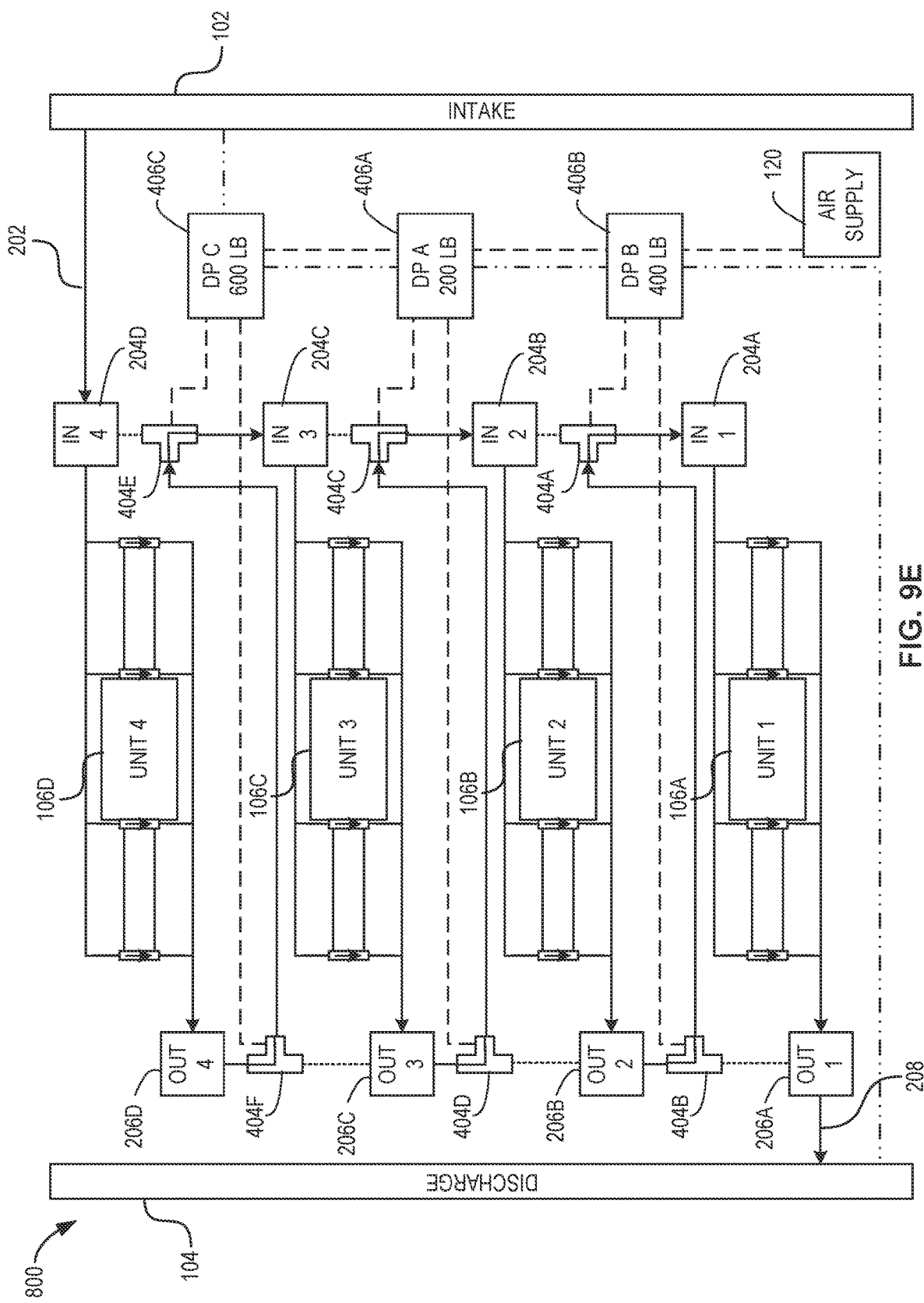
FIG. 9E illustrates the first example four-compressor system of FIG. 8 in which fluid flowing from the fluid intake to the fluid discharge reaches a third differential pressure.

FIG. 9E illustrates the first four-compressor system 800 of FIG. 8 in a state or mode in which fluid flowing from the fluid intake 102 to the fluid discharge 104 reaches a differential pressure of 600 psi. In response to measuring the 600 psi differential pressure of the fluid, the third differential pressure sensor 406C directs compressed air from the air supply 120 to the fifth control valve 404E and the sixth control valve 404F. In response to receiving the compressed air, the fifth control valve 404E and the sixth control valve 404F switch from the first state to the second state. As such, the fifth control valve 404E prevents the fluid from flowing between the fourth compressor inlet 204D and the third compressor inlet 204C, and the sixth control valve 404F prevents the fluid from flowing between the fourth compressor outlet 206D and the third compressor outlet 206C.

In FIG. 9E, fluid flows from the fluid intake 102 to the fourth compressor inlet 204D via the inlet piping 202. The fluid further flows from the fourth compressor inlet 204D to the fourth compressor outlet 206D via the fourth compressor unit 106D, then flows from the fourth compressor outlet 206D to the third compressor inlet 204C via the sixth control valve 404F and the fifth control valve 404E. The fluid further flows from the third compressor inlet 204C to the third compressor outlet 206C via the third compressor unit 106C, then flows from the third compressor outlet 206C to the second compressor inlet 204B via the fourth control valve 404D and the third control valve 404C. Further, the fluid flows from the second compressor inlet 204B to the second compressor outlet 206B via the second compressor unit 106B, then flows from the second compressor outlet 206B to the first compressor inlet 204A via the second control valve 404B and the first control valve 404A. The fluid then flows from the first compressor inlet 204A to the first compressor outlet 206A via the first compressor unit 106A, and exits the first compressor outlet 206A via the outlet piping 208 to the fluid discharge 104.

In the illustrated example of FIG. 9E, all of the compressor units 106 are arranged in series. As such, the fluid flowing between the fluid intake 102 and the fluid discharge 104 is compressed by 200 psi by the fourth compressor unit 106D, followed by 200 psi by the third compressor unit 106C, 200 psi by the second compressor unit 106B, and 200 psi by the first compressor unit 106A. Accordingly, the first four-compressor system 800 in the configuration of FIG. 9D can compress the fluid up to a combined pressure of 800 psi and a combined rate of compression of 0.5 acfm.

In the illustrated examples of FIGS. 8 and/or 9A-9E, in response to the compressor units 106 being configured in parallel (e.g., as shown in FIG. 9B), each of the compressor units 106 can operate at the same stroke speed and/or rate (e.g., each of the compressor units 106 compresses the fluid at 1 acfm). In FIG. 9C, the compressor units 106 are no longer arranged all in parallel. As such, the stroke speed and/or rate across the compressor units 106 can differ. For example, in FIG. 9C, the fourth compressor unit 106D and the third compressor unit 106C first compress the fluid in parallel, and then the compressed fluid flows in series to the second compressor unit 106B and the first compressor unit 106A to be further compressed in parallel. The first compressor unit 106A and the second compressor unit 106B can be idled while the fluid is being compressed by the third compressor unit 106C and the fourth compressor unit 106D. As such, power (e.g., from the compressed air of the air supply 120) can be directed to only act on the pistons of the compressor units 106 currently doing work on the fluid (e.g., the third compressor unit 106C and the fourth compressor unit 106D) instead of being directed to act on pistons not currently receiving fluid (e.g., the first compressor unit 106A and the second compressor unit 106B). Because the power is limited by the amount and/or rate of compressed air available from the air supply 120, directing the compressed air primarily to active ones of the compressor units 106 provides greater power efficiency and reduces compression time.

For examples in which all of the compressor units 106 are configured in series (e.g., as shown in FIG. 9E), the stroke speed and/or rate can be greater for the compressor units 106 closest to the fluid intake 102 (e.g., the fourth compressor units 106A), and the stroke speed and/or rate can decrease for the compressor units 106 further from the fluid intake 102. For example, as the fluid flows through the fourth compressor unit 106D to the third compressor unit 106C, from the third compressor unit 106C to the second compressor unit 106B, etc., the fluid may decrease in volume at each stage of compression. Further, the fluid may undergo a phase change (e.g., from gas to liquid) as the fluid travels through the first four-compressor system 800. As such, the fluid at an earlier stage of compression (e.g., at the fourth compressor unit 106D) can involve a greater stroke speed and/or rate to pump that fluid compared to the fluid at a later stage of compression (e.g., at the first compressor unit

106A). In one example, the fluid involves 200 strokes in a gas phase for every 1 stroke in a liquid phase. In other words, the fourth compressor unit 106D cycles 200 times before enough of the fluid enters the first compressor unit 106A to cause the first compressor unit 106A to cycle one time. As such, an example implementation in which the compressor units 106 cycle at the same speed would take significantly longer to compress the fluid compared to the example implementation in which the compressor units 106 at the earlier stages of compression cycle faster than the compressor units 106 at the later stages of compression. Advantageously, the first four-compressor system 800 allows the compressor units 106 to cycle independently and at different speeds, reducing the time to compress the fluid.

Figure 10:
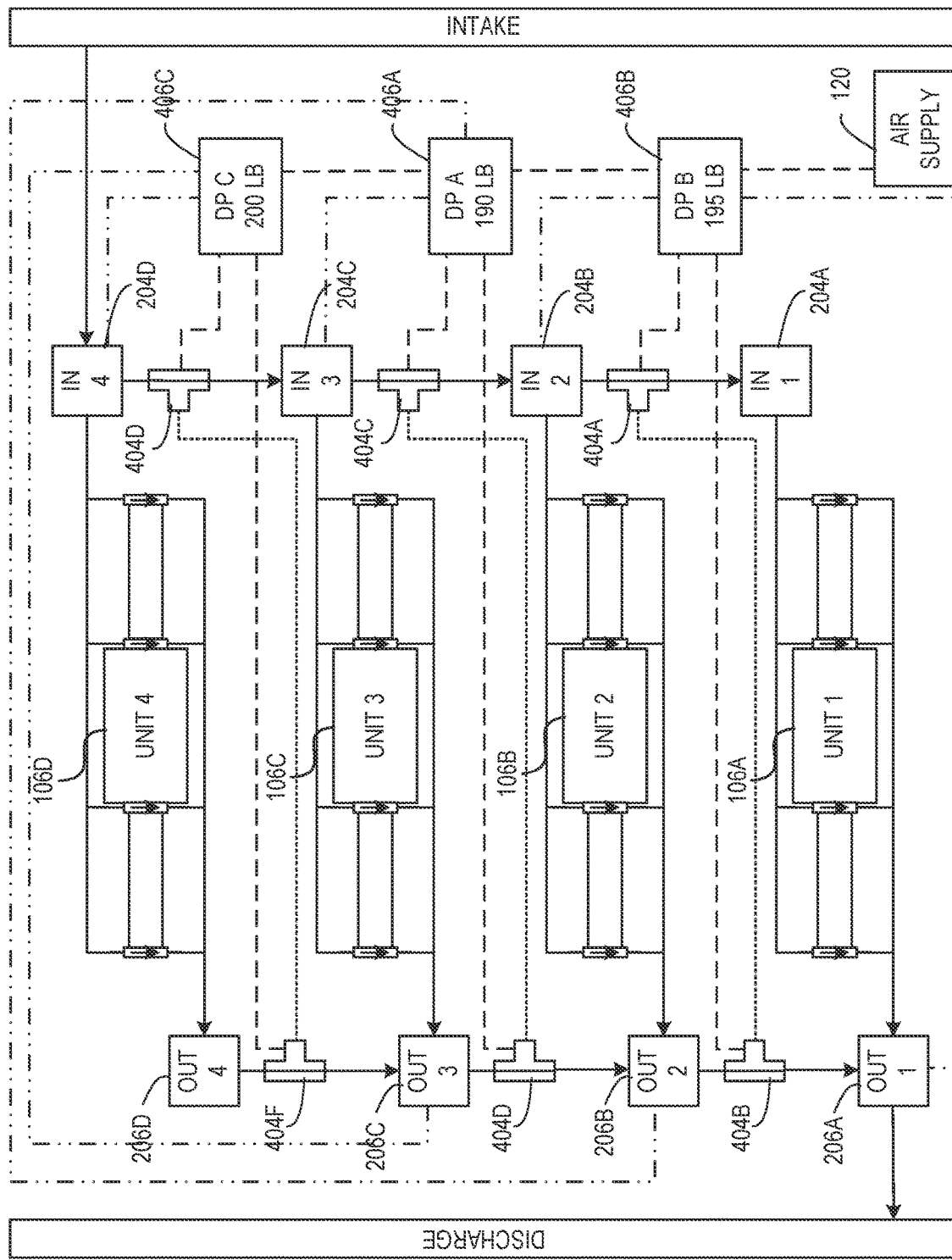
FIG. 10 illustrates the first example four-compressor system of FIG. 8 with an example alternate arrangement of the differential pressure sensors.

FIG. 10 illustrates the first four-compressor system 800 of FIG. 8 with an example alternate arrangement of the differential pressure sensors 406. In the illustrated example of FIG. 10, the first differential pressure sensor 406A is fluidly coupled between and/or measures a first differential pressure between the third compressor inlet 204C and the second compressor outlet 206B; the second differential pressure sensor 406B is fluidly coupled between and/or measures a second differential pressure between the second compressor inlet 204B and the first compressor outlet 206A; and the third differential pressure sensor 406C is fluidly coupled between and/or measures a third differential pressure between the fourth compressor inlet 204D and the third compressor outlet 206C. In FIG. 10, the first pressure threshold of the first differential pressure sensor 406A is 190 psi, the second pressure threshold of the second differential pressure sensor 406B is 195 psi, and the third pressure threshold of the third differential pressure sensor 406C is 200 psi.

In the illustrated example of FIG. 10, each of the differential pressure sensors 406 can switch the corresponding control valves 404 between the first state and the second state based on the corresponding measured differential pressures (e.g., the first differential pressure, the second differential pressure, and/or the third differential pressure). For example, the first differential pressure sensor 406A switches the third control valve 404C and the fourth control valve 404D in response to the first differential pressure being at or above the first pressure threshold; the second differential pressure sensor 406B switches the first control valve 404A and the second control valve 404B in response to the second differential pressure being at or above the second pressure threshold; and the third differential pressure sensor 406C switches the fifth control valve 404E and the sixth control valve 404F in response to the third differential pressure being at or above the third pressure threshold.

In the illustrated example of FIG. 10, the differential pressure sensors 406 are configured to different pressure thresholds (e.g., 190 psi, 195 psi, and 200 psi) to avoid chatter (e.g., rapid opening and closing) of the control valves 404. In an example, each of the differential pressure sensors 406 is configured to the same pressure threshold of 200 psi. In such an example, in response to the fluid between the fluid intake 102 and the fluid discharge 104 reaching a total differential pressure of 200 psi, a first one of the differential pressure sensors 406 (e.g., the third differential pressure sensor 406C) detects the total differential pressure and directs compressed air from the air supply 120 to the corresponding control valves 404 (e.g., the fifth control valve 404E and the sixth control valve 404F). In some examples, a delay may occur between the first one of the differential pressure sensors 406 directing the compressed air and the corresponding control valves 404 switching from the first state to the second state. During this delay, the remining differential pressure sensors 406 (e.g., the first differential pressure sensor 406A and/or the second differential pressure sensor 406B) may detect the total differential pressure of 200 psi and, in turn, also trigger the corresponding control valves 404 to switch. In such an example, the first four-compressor system 800 switches to an all-series configuration (e.g., as shown in FIG. 9E), and the fluid is compressed such that the total differential pressure between the fluid inlet 102 and the fluid outlet 104 drops below 200 psi. In response, one or more of the control valves 404 may switch back to the first state from the second state, and the total differential pressure may rise again. The process of opening and closing the control valves 404 may repeat, causing the control valves 404 to chatter (e.g., rapidly open and close) and generate noise, for example.

To avoid chatter of the control valves 404, each of the differential pressure sensors 406 can be configured to a different pressure threshold close to 200 psi (e.g., 190 psi, 195 psi, and 200 psi). As such, the differential pressure sensors 406 can be triggered one at a time while accounting for delay. For example, the first differential pressure sensor 406A is triggered at a first differential pressure of 190 psi, and compressed air can switch the third control valve 404C and the fourth control valve 404D prior to the total differential pressure of the fluid reaching a value of 195 psi and triggering the second differential pressure sensor 406B.

In some examples, the control valves 404 can be electrically-controlled valves that switch between the first state and the second state based on an electrical signal received from a remote device (e.g., the pressure control circuitry 1300 of FIG. 13 below). Advantageously, for examples in which the control valves 404 are electrically controlled via the electrical signal, the delay in switching each of the control valves 404 is reduced using the electrical signal compared to the compressed air. As such, the control valves 404 controlled via electrical signal can be configured to the same pressure threshold (e.g., 200 psi). However, use of electrical components proximate a flammable and/or combustible fluid (e.g., natural gas) may pose a safety concern and, as such, an air-driven compressor system as described in FIGS. 8, 9A-9E may be preferred in applications requiring transfer of a flammable and/or combustible fluid.

FIG. 11 illustrates an example table 1100 of compression pressures and rates of compression corresponding to combined states of the control valves 404 of FIGS. 8, 9A-9E, and/or 10. In the example table 1100, an example first column 1102 corresponds to the first control valve 404A and the second control valve 404B, an example second column 1104 corresponds to the third control valve 404C and the fourth control valve 404D, and an example third column 1106 corresponds to the fifth control valve 404E and the sixth control valve 404F. Further, an example fourth column 1108 corresponds to the maximum pressure of compressed gas, in psi, for a combined state of the control valves 404. An example fifth column 1110 corresponds to the rate of compression of the gas, in acfm, for the combined state of the control valves 404.

In the illustrated example of FIG. 11, the maximum pressure and rate of compression corresponding to a configuration of the control valves 404 is shown in rows 1100A-1100D of the table 1100. For example, in response to all of the control valves 404 being in the first state and/or parallel (e.g., first row 1100A of table 1100), the maximum pressure of compressed gas through the first four-compressor system 800 is 200 psi and the rate of compression is 4 acfm. In the illustrated example, the first row 1100A, the second row 1100B, the third row 1100C, and the fourth row 1100D of the table 1100 correspond to the configuration of the first four-compressor system 800 in FIGS. 9B, 9C, 9D, and 9E, respectively. In some examples, values of the maximum pressure and the rate of compression can be different in response to the compressor units 106A-106D having different individual pressures and/or rates of compression.

Figure 12:
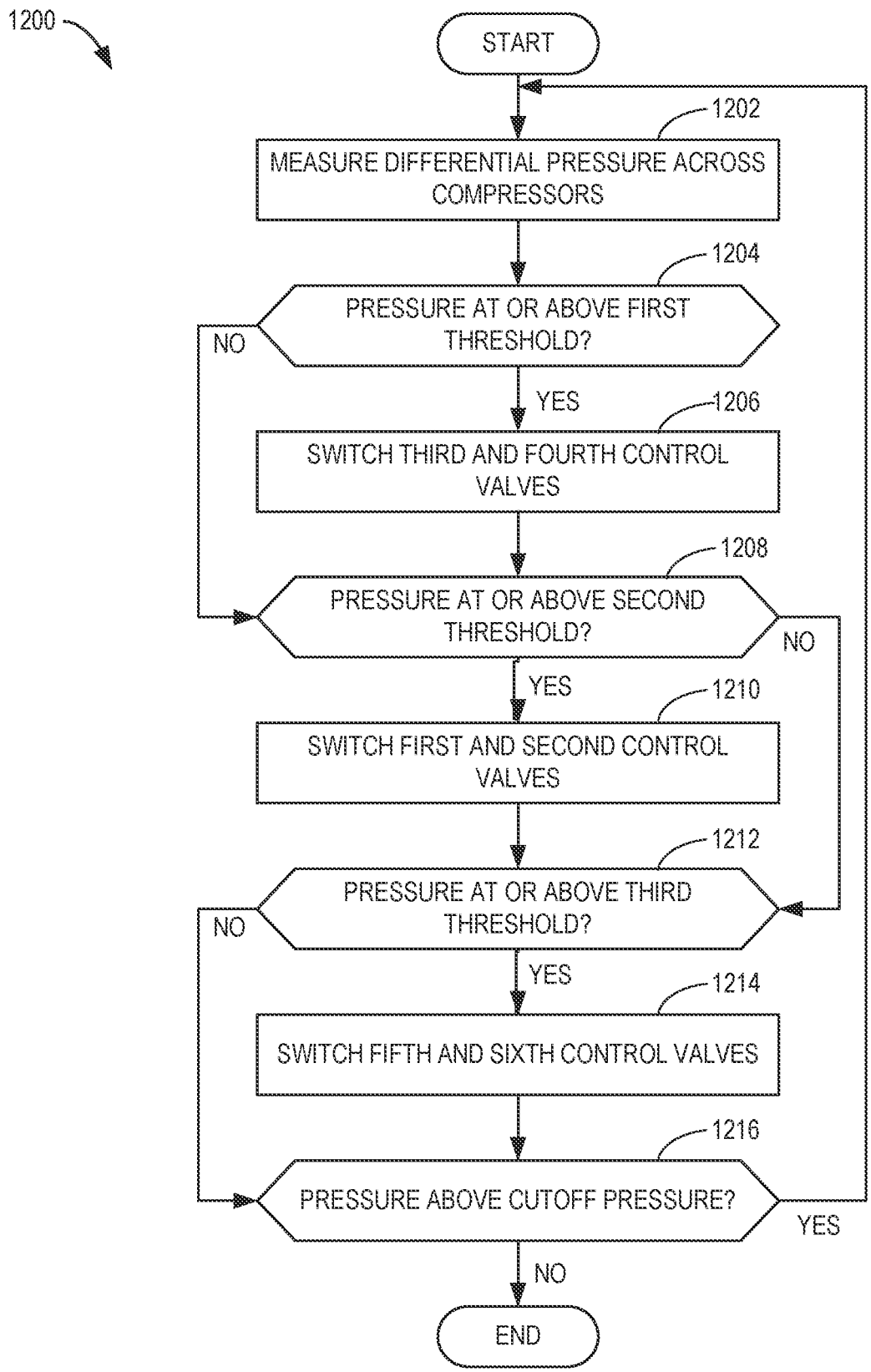
FIG. 12 is a flowchart representative of example instructions that may be executed to implement the first example four-compressor system of FIGS. 8, 9A-9E, and/or 10.

FIG. 12 is a flowchart representative of example instructions 1200 that may be executed to implement the first four-compressor system 800 of FIGS. 8, 9A-9E, and/or 10. The process of FIG. 12 begins as the first four-compressor system 800 is turned on and fluid is flowing from the fluid intake 102 to the fluid discharge 104.

At block 1202, a differential pressure of the fluid is measured across the compressor units 106. For example, the first differential pressure sensor 406A, the second differential pressure sensor 406B, and the third differential pressure sensor 406C receive the fluid flowing between the fluid intake 102 and the fluid discharge 104 to determine the differential pressure of the fluid.

At block 1204, the first differential pressure sensor 406A determines whether the differential pressure of the fluid is at or above a first pressure threshold (e.g., 200 psi). In response to the differential pressure being at or above the first pressure threshold (e.g., block 1204 returns a result of YES), the process proceeds to block 1206. Alternatively, in response to the differential pressure not being at or above the first pressure threshold (e.g., block 1204 returns a result of NO), the process proceeds to block 1208.

At block 1206, the third control valve 404C and the fourth control valve 404D switch from the first state to the second state. For example, the pressure of the fluid in the first differential pressure sensor 406A causes the first differential pressure sensor 406A to direct compressed air from the air supply 120 to the third control valve 404C and the fourth control valve 404D. In response to receiving the compressed air, the third control valve 404C and the fourth control valve 404D switch from the first state to the second state.

At block 1208, the second differential pressure sensor 406B determines whether the differential pressure of the fluid is at or above a second pressure threshold (e.g., 400 psi). In response to the differential pressure being at or above the second pressure threshold (e.g., block 1208 returns a result of YES), the process proceeds to block 1210. Alternatively, in response to the differential pressure not being at or above the second pressure threshold (e.g., block 1208 returns a result of NO), the process proceeds to block 1212.

At block 1210, the first control valve 404A and the second control valve 404B switch from the first state to the second state. For example, the pressure of the fluid in the second differential pressure sensor 406B causes the second differential pressure sensor 406B to direct compressed air from the air supply 120 to the first control valve 404A and the second control valve 404B. In response to receiving the compressed air, the first control valve 404A and the second control valve 404B switch from the first state to the second state.

At block 1212, the third differential pressure sensor 406C determines whether the differential pressure of the fluid is at or above a third pressure threshold (e.g., 600 psi). In response to the differential pressure being at or above the third pressure threshold (e.g., block 1212 returns a result of YES), the process proceeds to block 1214. Alternatively, in response to the differential pressure not being at or above the third pressure threshold (e.g., block 1212 returns a result of NO), the process proceeds to block 1216.

At block 1214, the fifth control valve 404E and the sixth control valve 404F switch from the first state to the second state. For example, the pressure of the fluid in the third differential pressure sensor 406C causes the third differential pressure sensor 406C to direct compressed air from the air supply 120 to the fifth control valve 404E and the sixth control valve 404F. In response to receiving the compressed air, the fifth control valve 404E and the sixth control valve 404F switch from the first state to the second state.

At block 1216, the differential pressure sensors 406 determine whether the differential pressure of the fluid is above a cutoff pressure (e.g., 0 psi, 1 psi, etc.). For example, the differential pressure at or below the cutoff pressure indicates that the first four-compressor system 800 is no longer compressing the fluid from the fluid intake 102 and/or indicates that remaining fluid has been evacuated. In response to the differential pressure sensors 406 determining that the fluid is above the cutoff pressure (e.g., block 1216 returns a result of YES), the process returns to block 1202. Alternatively, in response to the differential pressure sensors 406 determining that the fluid is at or below the cutoff pressure (e.g., block 1216 returns a result of NO), the process ends.

Figure 13:
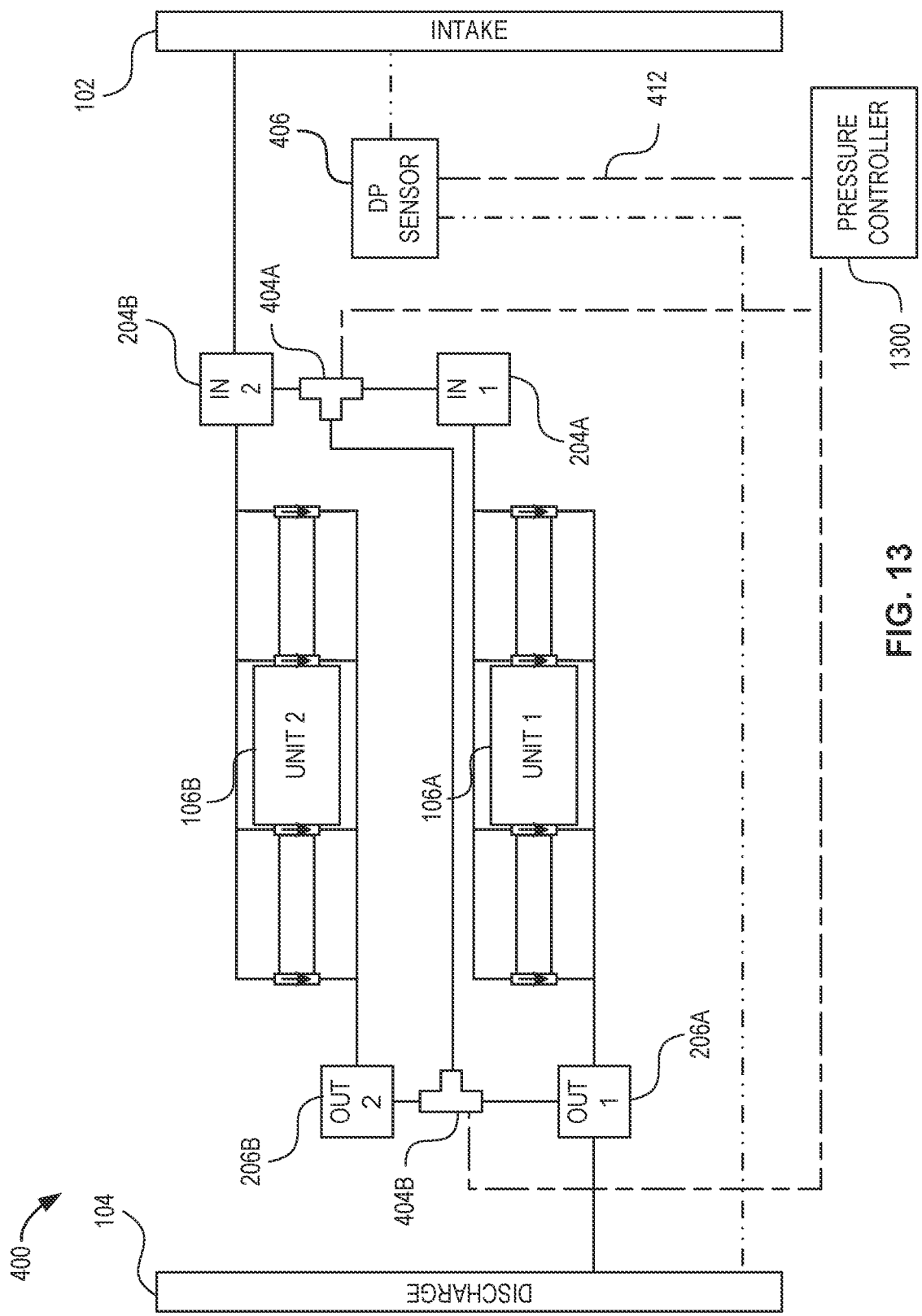
FIG. 13 illustrates example pressure control circuitry in accordance with the teachings of this disclosure implemented on the example configurable pressure compression system of FIG. 4.

FIG. 13 illustrates example pressure control circuitry 1300 in accordance with the teachings of this disclosure implemented on the example configurable pressure compression system 400 of FIG. 4. In the illustrated example of FIG. 13, the example pressure control circuitry 1300 is communicatively coupled to the differential pressure sensor 406 and electrically coupled to the first control valve 404A and the second control valve 404B. In the illustrated example of FIG. 13, the control valves 404 are electrically-driven valves, where the control valves 404 can switch between the first state and the second state based on an electrical signal received from the pressure control circuitry 1300. In some examples, the pressure control circuitry 1300 can be implemented on the first four-compressor system 800 of FIGS. 8, 9A-9E, and/or 10.

In FIG. 13, the differential pressure sensor 406 measures a differential pressure of the gas between the fluid intake 102 and the fluid discharge 104. In the illustrated example of FIG. 13, the differential pressure sensor 406 can wirelessly transmit a value of the differential pressure to the pressure control circuitry 1300. In some examples, the differential pressure sensor 406 can transmit the value of the differential pressure via a wired connection with the pressure control circuitry 1300.

In the illustrated example of FIG. 13, the pressure control circuitry 1300 can switch the compressor units 106A, 106B between the series arrangement and the parallel arrangement based on the differential pressure of the gas. In the illustrated example, the pressure control circuitry 1300 receives the measured value of the differential pressure from the differential pressure sensor 406. The pressure control circuitry 1300 determines whether the differential pressure satisfies a threshold pressure (e.g., 200 psi). In some examples, in response to determining that the differential pressure is greater than the threshold pressure, the pressure control circuitry 1300 can send a first electrical signal to the control valves 404 to switch the control valves 404 from the first state to the second state (e.g., switch the compressor units 106A, 106B from the parallel arrangement to the series arrangement). In such examples, the compressor units 106A, 106B in the series arrangement can operate at an increased pressure compared to the parallel arrangement. In some examples, in response to determining that the differential pressure is less than the threshold pressure, the pressure control circuitry 1300 can send a second electrical signal to the control valves 404 to switch the control valves 404 from the second state to the first state (e.g., switch the compressor units 106A, 106B from the series arrangement to the parallel arrangement). In such examples, the compressor units 106A, 106B in the parallel arrangement can operate at an increased flow rate compared to the series arrangement. In some examples, the pressure control circuitry 1300 can send a third signal to the control valves 404 to switch the control valves 404 to the third state. In some examples, the pressure control circuitry 1300 switches the control valves 404 to the third state in response to maintenance and/or testing procedures being performed on the first control valve 404A and/or the second control valve 404B.

In examples disclosed herein, the pressure control circuitry 402 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device (s) (PLD(s)), field programmable logic device(s) (FPLD(s)), digital signal processor(s) (DSP(s)), graphics processing units (GPUs), etc.

Figure 14:
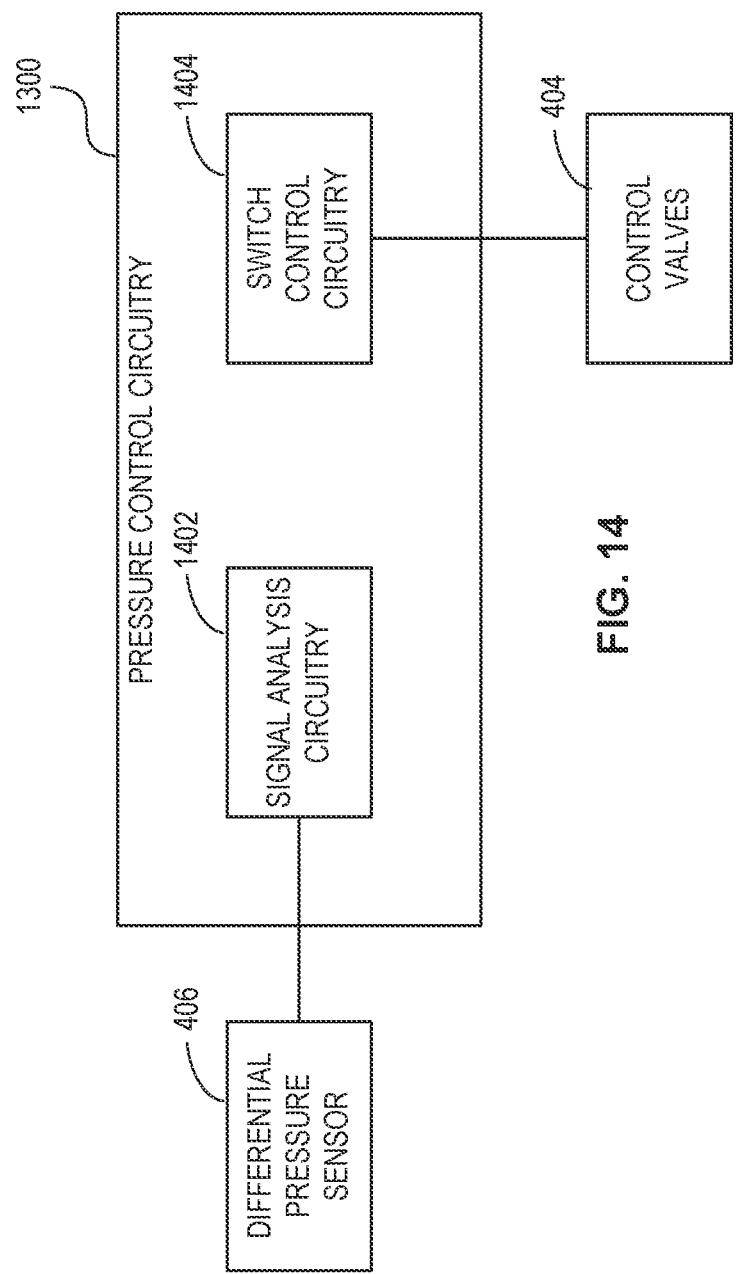
FIG. 14 is a block diagram of the example pressure control circuitry of FIG. 13.

FIG. 14 is a block diagram of the example pressure control circuitry 1300 of FIG. 13. The pressure control circuitry 1300 includes example signal analysis circuitry 1402 coupled to the differential pressure sensor 406 of FIG. 13, and example switch control circuitry 1404 coupled to the control valves 404 (e.g., the first control valve 404A and the second control valve 404B) of FIG. 13. In some examples, the example switch control circuitry 904 is coupled to each of the control valves 404 in the first four-compressor system 800 of FIGS. 8, 9A-9E, and/or 10 (e.g., the first control valve 404A, the second control valve 404B, the third control valve 404C, the fourth control valve 404D, the fifth control valve 404E, and/or the sixth control valve 404F).

In the illustrated example of FIG. 14, the example signal analysis circuitry 1404 receives the signal from the differential pressure sensor 406. The signal analysis circuitry 1402 determines the measured value of the differential pressure of the gas based on the signal. In examples where multiple ones of the differential pressure sensor 406 are implemented in a multiple-compressor system (e.g., the first four-compressor system 800), the signal analysis circuitry 1402 can determine multiple values of the differential pressure corresponding to each of the multiple ones of the differential pressure sensor 406.

In the illustrated example of FIG. 14, the switch control circuitry 1404 compares the differential pressure to a threshold (e.g., the pressure threshold). For example, in response to determining that the differential pressure is greater than the threshold, the switch control circuitry 1404 sends a first electrical signal to the control valves 404 to switch the control valves 404 to the first state corresponding to the parallel arrangement. Alternatively, in response to determining that the differential pressure is less than the threshold, the switch control circuitry 1404 sends a second electrical signal to the control valves 404 to switch the control valves 404 to the second state corresponding to the series arrangement. For some examples, the switch control circuitry 1404 can send multiple signals respective to multiple control valves (e.g., the first control valve 404A, the second control valve 404B, the third control valve 404C, the fourth control valve 404D, the fifth control valve 404E, and/or the sixth control valve 404F), where each of the multiple control valves can be switched to the first state or the second state based on the multiple values of the differential pressure.

While an example manner of implementing the pressure control circuitry 1300 of FIG. 13 is illustrated in FIG. 14, one or more of the elements, processes and/or devices illustrated in FIG. 14 may be combined, divided, re-arranged, omitted, eliminated and/or implemented in any other way. Further, the example signal analysis circuitry 1402, the example switch control circuitry 1404 and/or, more generally, the example pressure control circuitry 1300 of FIG. 13 may be implemented by hardware, software, firmware and/or any combination of hardware, software and/or firmware. Thus, for example, any of the example signal analysis circuitry 1402, the example switch control circuitry 1404 and/or, more generally, the example pressure control circuitry 1300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example signal analysis circuitry 1402, the example switch control circuitry 1404 and/or, more generally, the example pressure control circuitry 1300 is/are hereby expressly defined to include a non-transitory computer readable storage device or storage disk such as a memory, a compact disk (CD), etc. including the software and/or firmware. Further still, the example pressure control circuitry 1300 of FIG. 13 may include one or more elements, processes and/or devices in addition to, or instead of, those illustrated in FIG. 14, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 15:
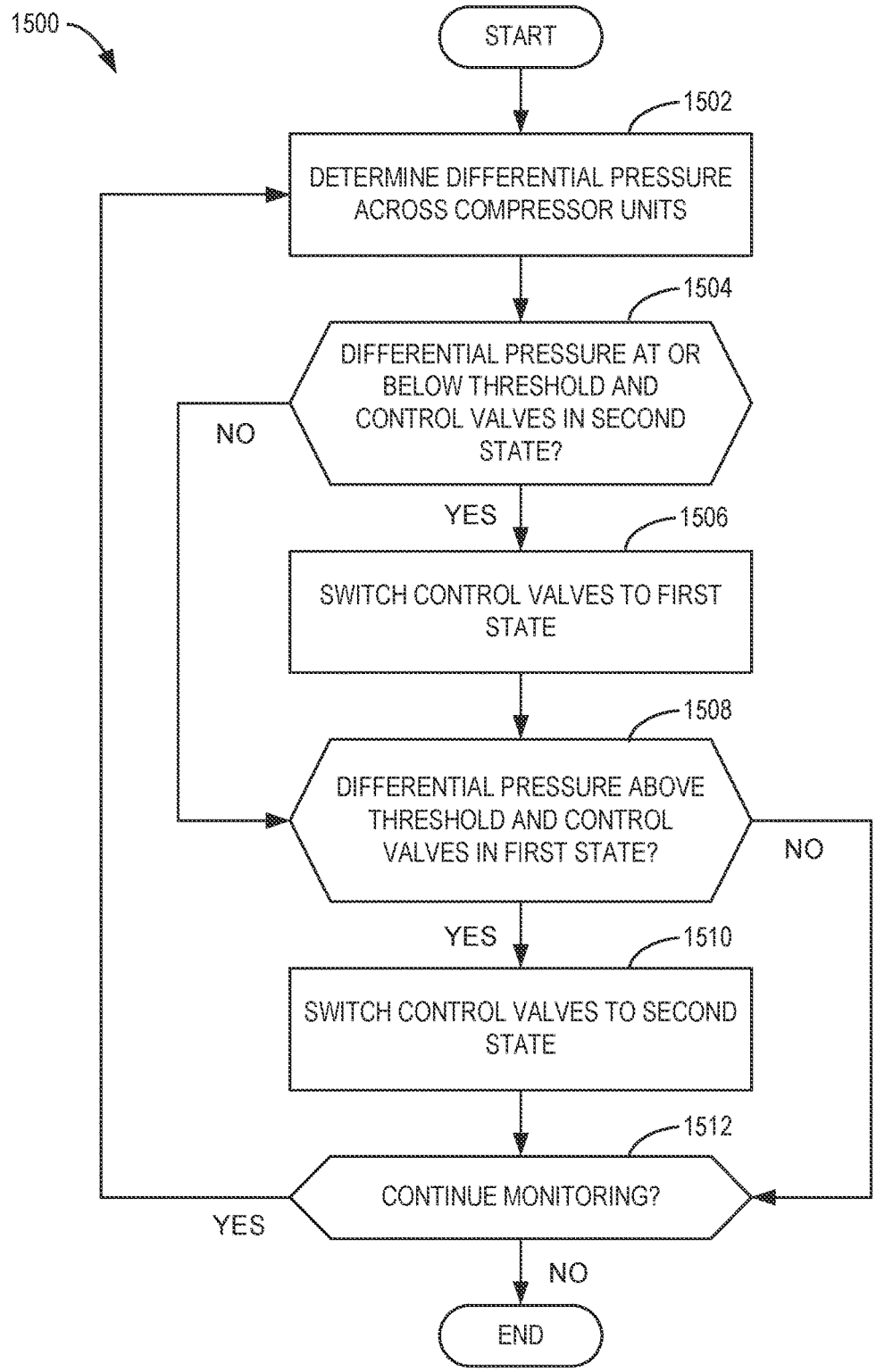
FIG. 15 is a flowchart representative of machine readable instructions which may be executed to implement the example pressure control circuitry of FIG. 13.

A flowchart representative of example hardware logic, machine readable instructions, hardware implemented state machines, and/or any combination thereof for implementing the pressure control circuitry 1300 of FIG. 14 is shown in FIG. 15. The machine readable instructions may be one or more executable programs or portion(s) of an executable program for execution by a computer processor and/or processor circuitry, such as the processor 1612 shown in the example processor platform 1600 discussed below in connection with FIG. 16. The program may be embodied in software stored on a non-transitory computer readable storage medium such as a CD-ROM, a floppy disk, a hard drive, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIG. 15, many other methods of implementing the example pressure control circuitry 1300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 15 is a flowchart representative of instructions 1500 which may be executed to implement the example pressure control circuitry 1300 of FIG. 13. The process of FIG. 15 begins with gas flowing into the configurable pressure compression system 400 of FIG. 13 via the fluid intake 102.

At block 1502, the pressure control circuitry 1300 determines the differential pressure across the compressor units 106A, 106B. For example, the signal analysis circuitry 1402 of FIG. 14 receives the signal from the differential pressure sensor 406 and determines the differential pressure based on the signal.

At block 1504, the pressure control circuitry 402 determines whether the differential pressure is at or below the threshold (e.g., the pressure threshold) and the control valves 404 are in the second state. For example, in response to the switch control circuitry 1404 of FIG. 14 determining that the differential pressure is at or below the threshold and the control valves 404 are in the second state (e.g., block 1504 returns a result of YES), the process proceeds to block 1506. Alternatively, in response to the switch control circuitry 1404 determining that the differential pressure is not at or below the threshold and/or the control valves 404 are in the first state (e.g., block 1504 returns a result of NO), the proceed proceeds to block 1508.

At block 1506, the pressure control circuitry 1300 switches the control valves 404 to the first state. For example, the switch control circuitry 1404 sends the first electrical signal to the control valves 404 to switch the control valves 404 from the second state to the first state.

At block 1508, the pressure control circuitry 1300 determines whether the differential pressure is above the threshold and the control valves 404 are in the first state. For example, in response to the switch control circuitry 1404 determining that the differential pressure is above the threshold and the control valves 404 are in the first state (e.g., block 1508 returns a result of YES), the process proceeds to block 1510. Alternatively, in response to the switch control circuitry 1404 determining that the differential pressure is not above the threshold and/or the control valves 404 are in the second state (e.g., block 1508 returns a result of NO), the process proceeds to block 1512.

At block 1510, the pressure control circuitry 1300 switches the control valves 404 to the second state. For example, the switch control circuitry 1404 sends the second electrical signal to the control valves 404 to switch the control valves 404 from the first state to the second state.

At block 1512, the pressure control circuitry 1300 determines whether to continue monitoring the configurable pressure compression system 400. For example, in response to the signal analysis circuitry 1402 determining that another signal is received from the differential pressure sensor 406 (e.g., block 1512 returns a result of YES), the process returns to block 1502. Alternatively, in response to the signal analysis circuitry 1402 not receiving another signal from the differential pressure sensor 406 (e.g., block 1512 returns a result of NO), the process ends.

Figure 16:
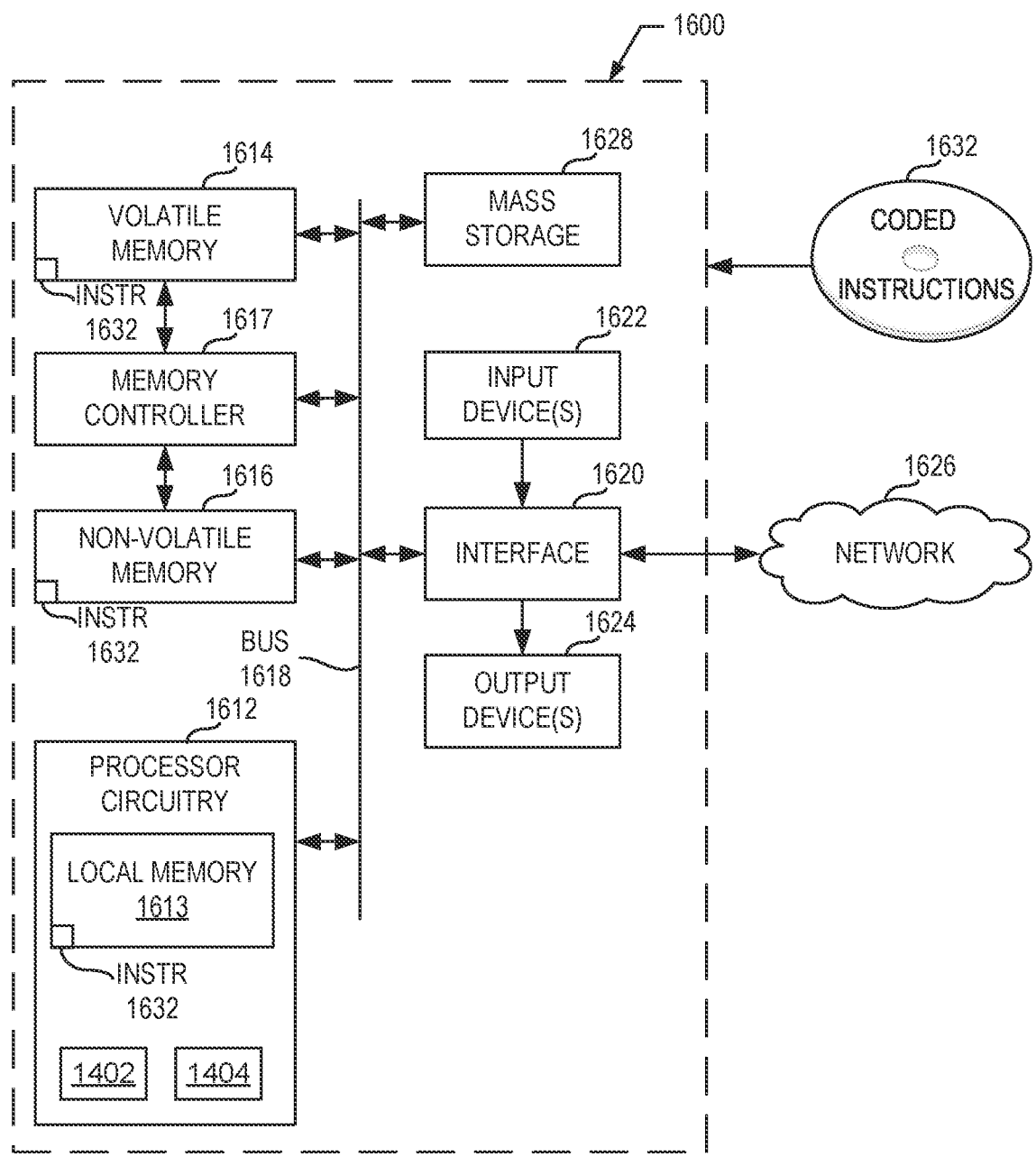
FIG. 16 is a block diagram of an example processing platform structured to execute the instructions of FIG. 15 to implement the example pressure control circuitry of FIG. 13.

FIG. 16 is a block diagram of an example processor platform 1600 structured to execute and/or instantiate the machine readable instructions and/or operations of FIG. 15 to implement the pressure control circuitry 1300 of FIG. 16. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the signal analysis circuitry 1402 and the switch control circuitry 1404.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output devices 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1632, which may be implemented by the machine readable instructions of FIG. 15, may be stored in the mass storage device 1628, in the volatile memory 1614, in the non-volatile memory 1616, and/or on a removable non-transitory computer readable storage medium such as a CD or DVD.

Figure 17:
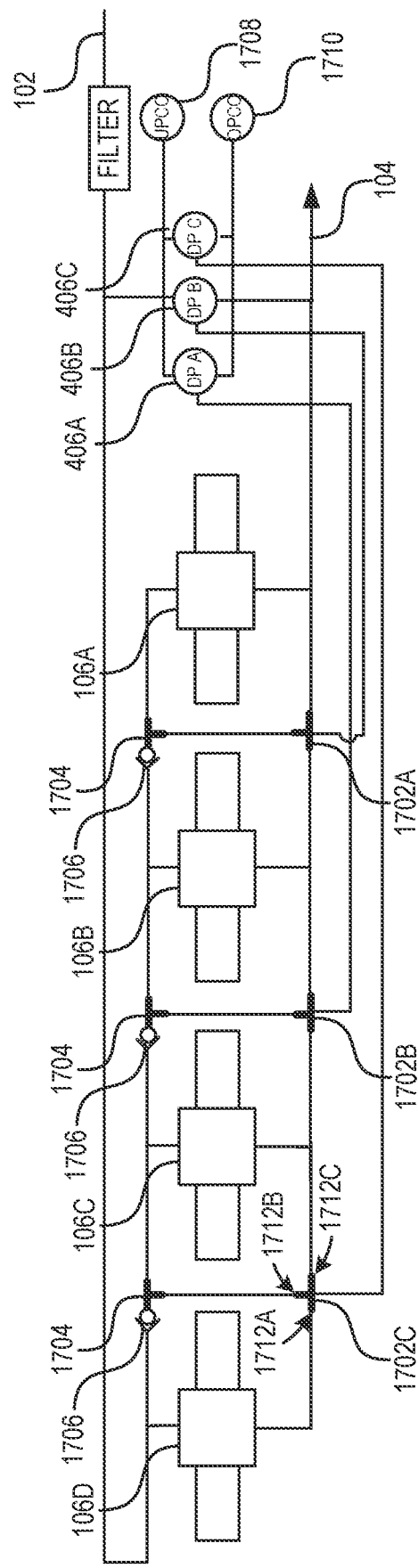
FIG. 17 illustrates a second example four-compressor system used in connection with examples disclosed herein.

FIG. 17 illustrates an example second four-compressor system 1700 used in connection with examples disclosed herein. In some examples, the second four-compressor system 1700 may be used instead of the first four-compressor system 800 of FIG. 8. In the illustrated example of FIG. 17, the first four-compressor system 800 includes the example compressor units 106A, 106B, 106C, 106D of the first four-compressor system 800 of FIG. 8 fluidly coupled between the fluid intake 102 and the fluid discharge 104. In the illustrated example of FIG. 17, an example first coaxial valve 1702A is fluidly coupled between the first and second compressor units 106A, 106B, an example second coaxial valve 1702B is fluidly coupled between the second and third compressor units 106B, 106C, and an example third coaxial valve 1702C is fluidly coupled between the third and fourth compressor units 106C, 106D. In this example, the first differential pressure 406A is operatively coupled to the second coaxial valve 1702B, the second differential pressure sensor 406B is operatively coupled to the third coaxial valve 1702C, and the third differential pressure sensor 406C is operatively coupled to the first coaxial valve 1702A.

While each of the differential pressure sensors 406A, 406D, 406C is operatively coupled to two of the control valves 404 in the illustrated example of FIG. 8, each of the differential pressure sensors 406A, 406B, 406C is operatively coupled to one of the coaxial valves 1702A, 1702B, 1702C. As such, mechanical complexity of the second four-compressor system 1700 of FIG. 17 is reduced compared to the first four-compressor system 800 of FIG. 8. In the illustrated example of FIG. 17, example pipe tees 1704 are implemented upstream of the compressor units 106A, 106B, 106C, 106D, and example upstream check valves 1706 are upstream of the pipe tees 1704. In this example, the upstream check valves 1706 restrict backflow of fluid through the pipe tees 1704 toward the fluid intake 102.

In the illustrated example of FIG. 17, the compressor units 106A, 106B, 106C, 106D are configured in parallel when the coaxial valves 1702A, 1702B, 1702C are in a first state, and the compressor units 106A, 106B, 106C, 106D are configured in series when the coaxial valves 1702A, 1702B, 1702C are in a second state. As described above in connection with FIGS. 9A-9E, the differential pressure sensors 406 can switch the coaxial valves 1702A, 1702B, 1702C between the first and second states based on a differential pressure measured between the fluid intake 102 and the fluid discharge 104. In the illustrated example of FIG. 17, an example under pressure cutoff 1708 and an example over pressure cutoff 1710 are fluidly coupled between the fluid intake 102 and the fluid discharge 104. In some examples, the under pressure cutoff 1708 disables operation of the compressor units 106A, 106B, 106C, 106D when the measured differential pressure between the fluid intake 102 and the fluid discharge 104 is less than a first cutoff pressure threshold, and the over pressure cutoff 1710 disables operation of the compressor units 106A, 106B, 106C, 106D when the measured differential pressure is greater than a second cutoff pressure threshold.

In the illustrated example of FIG. 17, the third coaxial valve 1702C includes an example first port 1712A fluidly coupled to the fourth compressor unit 106D, an example second port 1712B fluidly coupled to a corresponding one of the pipe tees 1704, and an example third port 1712C fluidly coupled to the fluid discharge 104.

FIGS. 18A and 18B are a schematic illustrations of the third coaxial valve 1702C of FIG. 17 in the first state and the second state, respectively. While the third coaxial valve 1702C is illustrated in this example, the illustrated examples of FIGS. 18A and 18B may correspond to the first coaxial valve 1702A and/or the second coaxial valve 1702B of FIG. 17. In the illustrated example of FIG. 18A, when the third coaxial valve 1702C is in the first state, the first port 1712A is fluidly coupled to the third port 1712C, and the second port 1712B is blocked to prevent flow of fluid therethrough. As such, when the third coaxial valve 1702C is in the first state, compressed fluid from the fourth compressor unit 106D of FIG. 17 flows to the fluid discharge 104 and is prevented from flowing to the third compressor unit 106D. Stated differently, when the third coaxial valve 1702C is in the first state of FIG. 18A, the third and fourth compressor units 106C, 106D are configured in parallel.

FIG. 18B illustrates the third coaxial valve 1702C in the second state. In the illustrated example of FIG. 18B, the first port 1712A is fluidly coupled to the second port 1712B, and the third port 1712C is blocked and/or otherwise closed to prevent flow of fluid therethrough. As such, when the third coaxial valve 1702C is in the second state, compressed fluid from the fourth compressor unit 106D of FIG. 17 flows to the third compressor unit 106C instead of flowing directly to the fluid discharge 104. Stated differently, when the third coaxial valve 1702C is in the second state of FIG. 18B, the third and fourth compressor units 106C, 106D are configured in series.

Returning to FIG. 17, when the coaxial valves 1702A, 1702B, 1702C are in the first state (e.g., corresponding to a parallel configuration of the compressor units 106A, 106B, 106C, 106D), the coaxial valves 1702A, 1702B, 1702C prevent and/or otherwise restrict flow of fluid between the compressor units 106A, 106B, 106C, 106D. As such, fluid from the fluid intake 102 is compressed by one of the compressor units 106A, 106B, 106C, 106D and flows to the fluid discharge 104. Alternatively, when the coaxial valves 1702A, 1702B, 1702C are in the second state (e.g., corresponding to a series configuration of the compressor units 106A, 106B, 106C, 106D), fluid from the fluid intake 102 is compressed by each of the compressor units 106A, 106B, 106C, 106D before flowing to the fluid discharge 104. In the illustrated example of FIG. 17, the upstream check valves 1706 at the inlet of the pipe tees 1704 cause the fluid to flow unidirectionally between the compressor units 106A, 106B, 106C, 106D in the series configuration, thus eliminating the need for additional control valves (e.g., the control valves 404 of FIGS. 9A-9B) therebetween.

Figure 19:
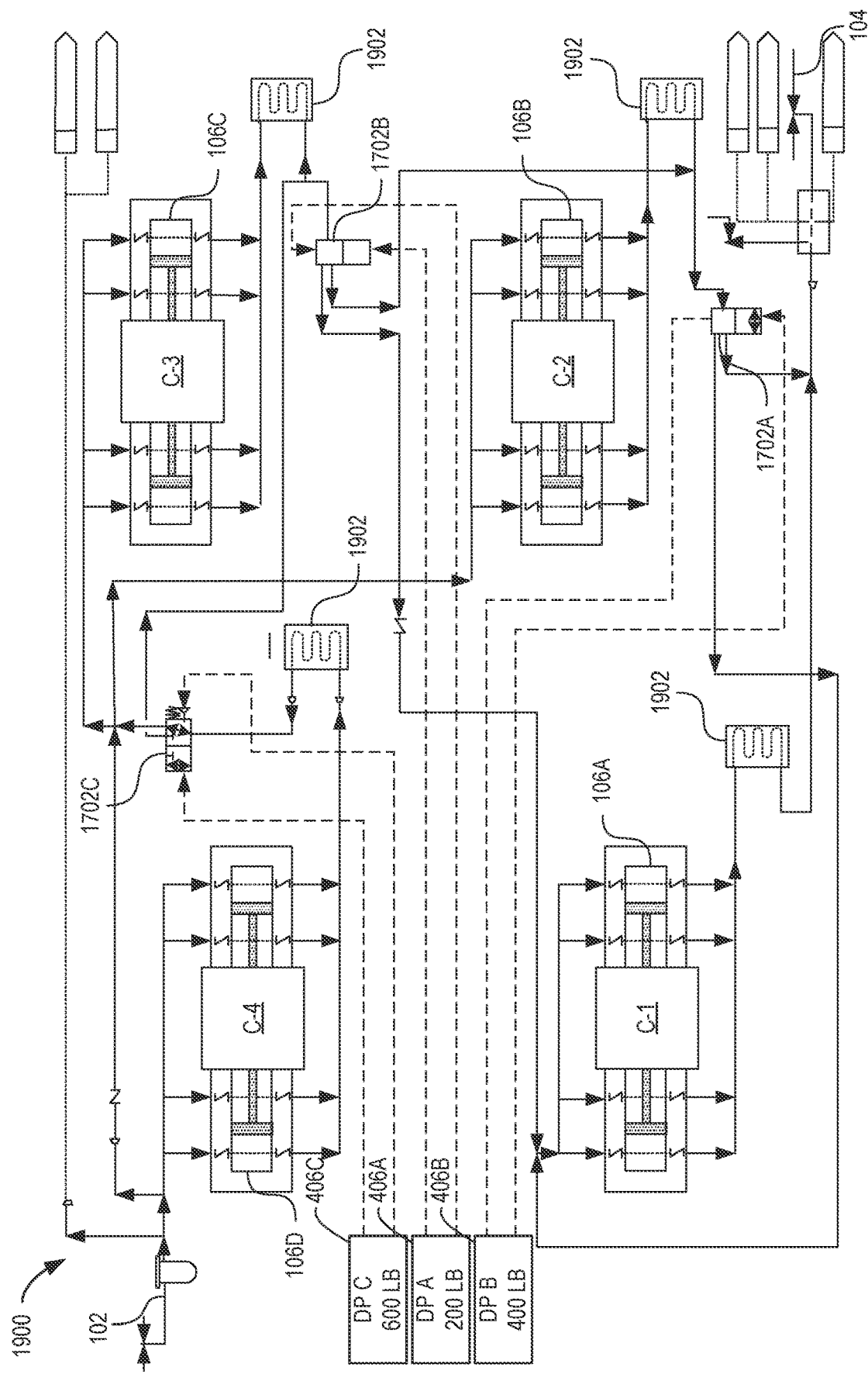
FIG. 19 is a schematic illustration of an example configurable fluid transfer and depressurization in accordance with teachings of this disclosure.

FIG. 19 is a schematic illustration of an example configurable fluid transfer and depressurization system (e.g., configurable fluid transfer system) 1900 in accordance with teachings of this disclosure. In this example, the configurable fluid transfer system 1900 implements the second four-compressor system 1700 of FIG. 17 including the compressor units 106A, 106B, 106C, 106D and the coaxial valves 1702A, 1702B, 1702C fluidly coupled therebetween. While the configurable fluid transfer system 1900 implements the second four-compressor system 1700 of FIG. 17 in this example, the configurable fluid transfer system 1900 may implement the first four-compressor system 800 of FIG. 8 instead. In such examples, the configurable fluid transfer system 1900 includes the control valves 404 of FIG. 8 instead of the coaxial valves 1702A, 1702B, 1703C. In the illustrated example of FIG. 19, example heat exchangers 1902 are fluidly coupled between the compressor units 106A, 106B, 106C, 106D and the coaxial valves 1702A, 1702B, 1702C to reduce a temperature of compressed fluid entering the coaxial valves 1702A, 1702B, 1702C. In examples disclosed herein, by enabling switching of the compressor units 106A, 106B, 106C, 106D between series and parallel configurations, the configurable fluid system 1900 of FIG. 19 can operate under a wider range of differential pressures between the fluid intake 102 and the fluid discharge 104 compared to the fluid transfer system 100 of FIG. 1A.

Figure 20:
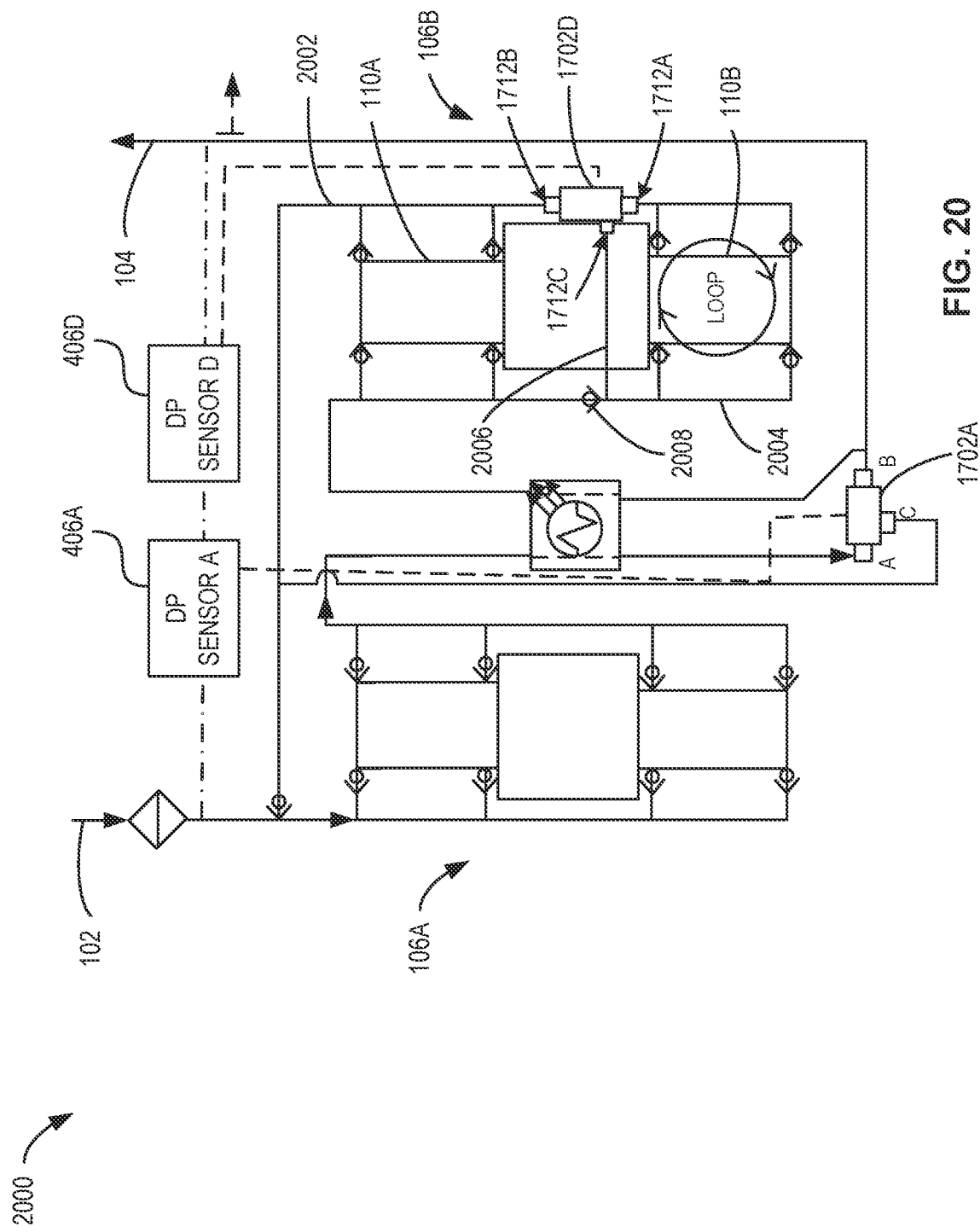
FIG. 20 illustrates an example configurable two-compressor system in which one of the example compressor units can be configured to function as a single-cylinder compressor.

FIG. 20 illustrates an example configurable two-compressor system 2000 in which one of the compressor units 106A, 106B can be configured to function as a single-cylinder compressor. For example, the compressor units 106A, 106B, 106C, 106D of the first four-compressor system 800 of FIG. 8 and/or the second four-compressor system 1700 of FIG. 17 each function as double-cylinder compressors in which fluid enters both compression cylinders 110A, 110B to be compressed by the respective gas pistons 108A, 108B of FIG. 1A. Alternatively, in the illustrated example of FIG. 20, the second compressor unit 106B can function as a double-cylinder compressor as described above in connection with FIG. 1A, and/or can function as a single-cylinder compressor by disabling one of the compression cylinders 110A, 110B. In some examples, a differential pressure through the second compressor unit 106B is increased (e.g., doubled) when the second compressor unit 106B functions as a single-cylinder compressor compared to when the second compressor unit 106B functions as a double-cylinder compressor.

In the illustrated example of FIG. 20, the first coaxial valve 1702A is fluidly coupled between the first and second compressor units 106A, 106B to switch the first and second compressor units 106A, 106B between series and parallel configurations. Furthermore, in this example, an example fourth coaxial valve 1702D is implemented along example inlet piping 2002 between the first and second compression cylinders 110A, 110B of the second compressor unit 106B. In this example, the first and second ports 1712A, 1712B of the fourth coaxial valve 1702D are fluidly coupled to the first and second compression cylinders 110A, 110B, respectively, and the third port 1712C of the fourth coaxial valve 1702D is fluidly coupled to example outlet piping 2004 of the second compression cylinder 110B via example loop piping 2006. The first differential pressure sensor 406A and an example fourth differential pressure sensor 406D are operatively coupled between the fluid intake 102 and the fluid discharge 104 to measure a differential pressure therebetween.

In the illustrated example of FIG. 20, the first differential pressure sensor 406A is operatively coupled to the first coaxial valve 1702A, and the fourth differential pressure sensor 406D is operatively coupled to the fourth coaxial valve 1702D. In some examples, the first and fourth coaxial valves 1702A, 1702D are initially in the first state (e.g., as shown in FIG. 18A) such that the first and second compressor units 106A, 106B are in a parallel configuration and the second compressor unit 106B functions as a double-cylinder compressor. In some examples, when the measured differential pressure between the fluid intake 102 and the fluid discharge 104 exceeds a first pressure threshold, the first differential pressure sensor 406A causes the first coaxial valve 1702A to switch from the first state to the second state (e.g., as shown in FIG. 18B), thereby switching the first and second compressor units 106A, 106B to a series configuration. In some such examples, the differential pressure across the first and second compressor units 106A, 106B is increased (e.g., doubled) when in the series configuration compared to the parallel configuration.

In some examples, when the measured differential pressure exceeds a second pressure threshold, the fourth differential pressure sensor 406D causes the fourth coaxial valve 1702D to switch from the first state to the second state. When the fourth coaxial valve 1702D is in the second state, the second port 1712B is blocked to prevent fluid from the inlet piping 2002 upstream of the fourth coaxial valve 1702D from flowing to the second compression cylinder 110B. As such, the fluid is instead directed only to the first compression cylinder 110A to be compressed therein. Additionally, when the fourth coaxial valve 1702D is in the second state, the third port 1712C is open such that fluid in the inlet piping 2002 downstream of the fourth coaxial valve 1702D continuously cycles through the second compression cylinder 110B. In particular, the fluid cycles in a clockwise direction of FIG. 20 from the inlet piping 2002 to the second compression cylinder 110B and the outlet piping 2004, and returns to the fourth coaxial valve 1702D via the loop piping 2006. Furthermore, one of the check valves 1706 is implemented on the outlet piping 2004 downstream of the loop piping 2006 to prevent and/or otherwise restrict backflow of fluid compressed by the first compression cylinder 110A.

In some examples, when the fourth coaxial valve 1702D in the second state causes fluid to cycle through the second compression cylinder 110B, the second compression cylinder 110B does not compress and/or otherwise perform work on the fluid cycling therethrough. As such, the second compression cylinder 110B is isolated and/or otherwise disabled when the fourth coaxial valve 1702D is in the second state. In such examples, fluid flowing to the second compressor unit 106B is compressed only by the first compression cylinder 110A, such that the second compressor unit 106B functions as a single-cylinder compressor. As such, by reducing a volume in which the fluid is to be compressed, the second compressor unit 106B functioning as a single-cylinder compressor compresses the fluid to a greater differential pressure compared to the second compressor unit 106B functioning as a double-cylinder compressor. While the fourth coaxial valve 1702D is implemented in connection with the second compressor unit 106B in the illustrated example of FIG. 20, one of the coaxial valves 1702 can additionally or alternatively be implemented in connection with the first compressor unit 106A.

Figure 21:
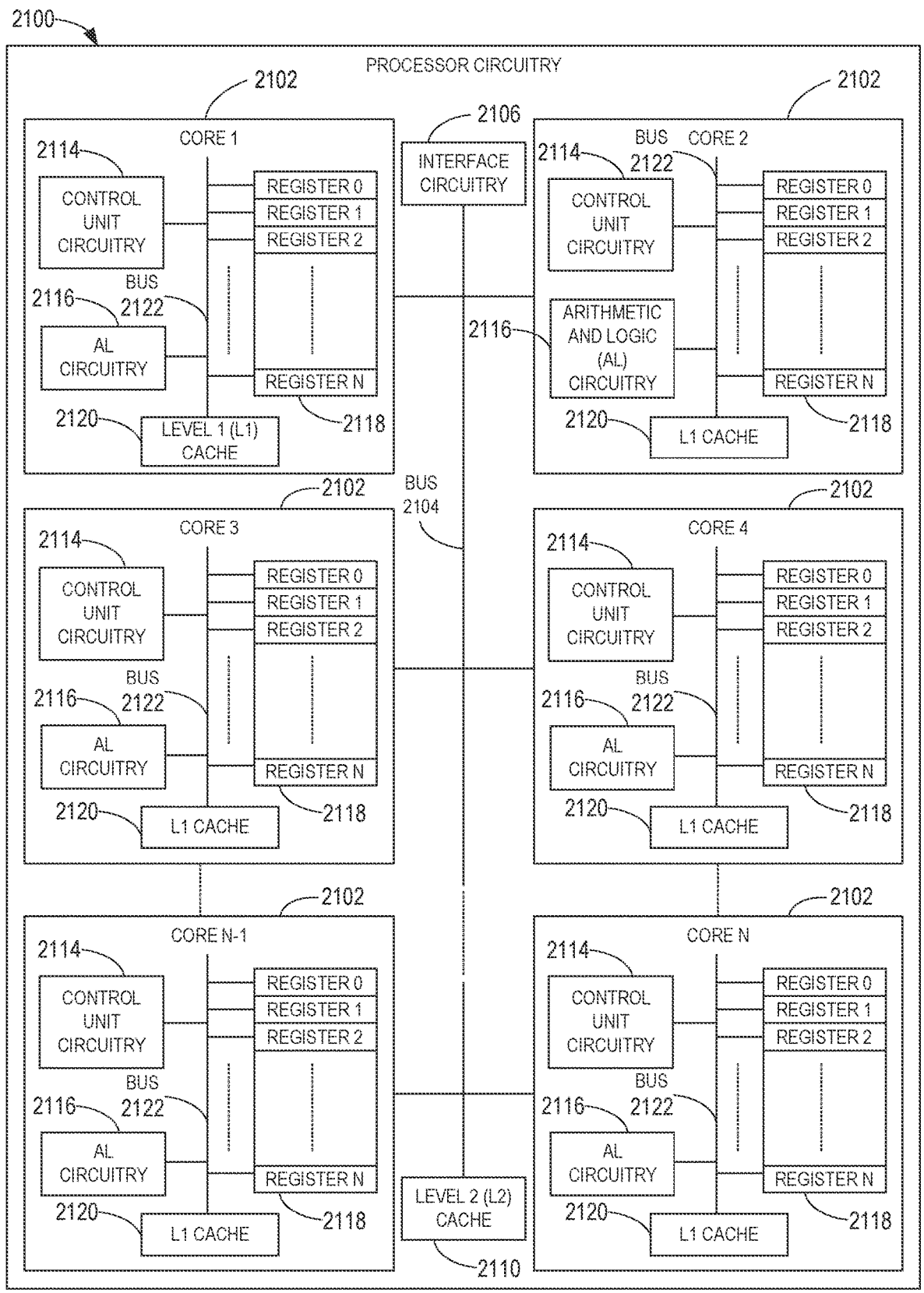
FIG. 21 is a block diagram of an example implementation of the processor circuitry of FIG. 16.

FIG. 21 is a block diagram of an example implementation of the processor circuitry 1612 of FIG. 16. In this example, the processor circuitry 1612 of FIG. 16 is implemented by a microprocessor 2100. For example, the microprocessor 2100 may implement multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations represented by the flowchart of FIG. 15.

The cores 2102 may communicate by an example bus 2104. In some examples, the bus 2104 may implement a communication bus to effectuate communication associated with one(s) of the cores 2102. For example, the bus 2104 may implement at least one of an Inter-Integrated Circuit (I2C) bus, a Serial Peripheral Interface (SPI) bus, a PCI bus, or a PCIe bus. Additionally or alternatively, the bus 2104 may implement any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2_cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the L1 cache 2120, and an example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The bus 2120 may implement at least one of an I2C bus, a SPI bus, a PCI bus, or a PCIe bus Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
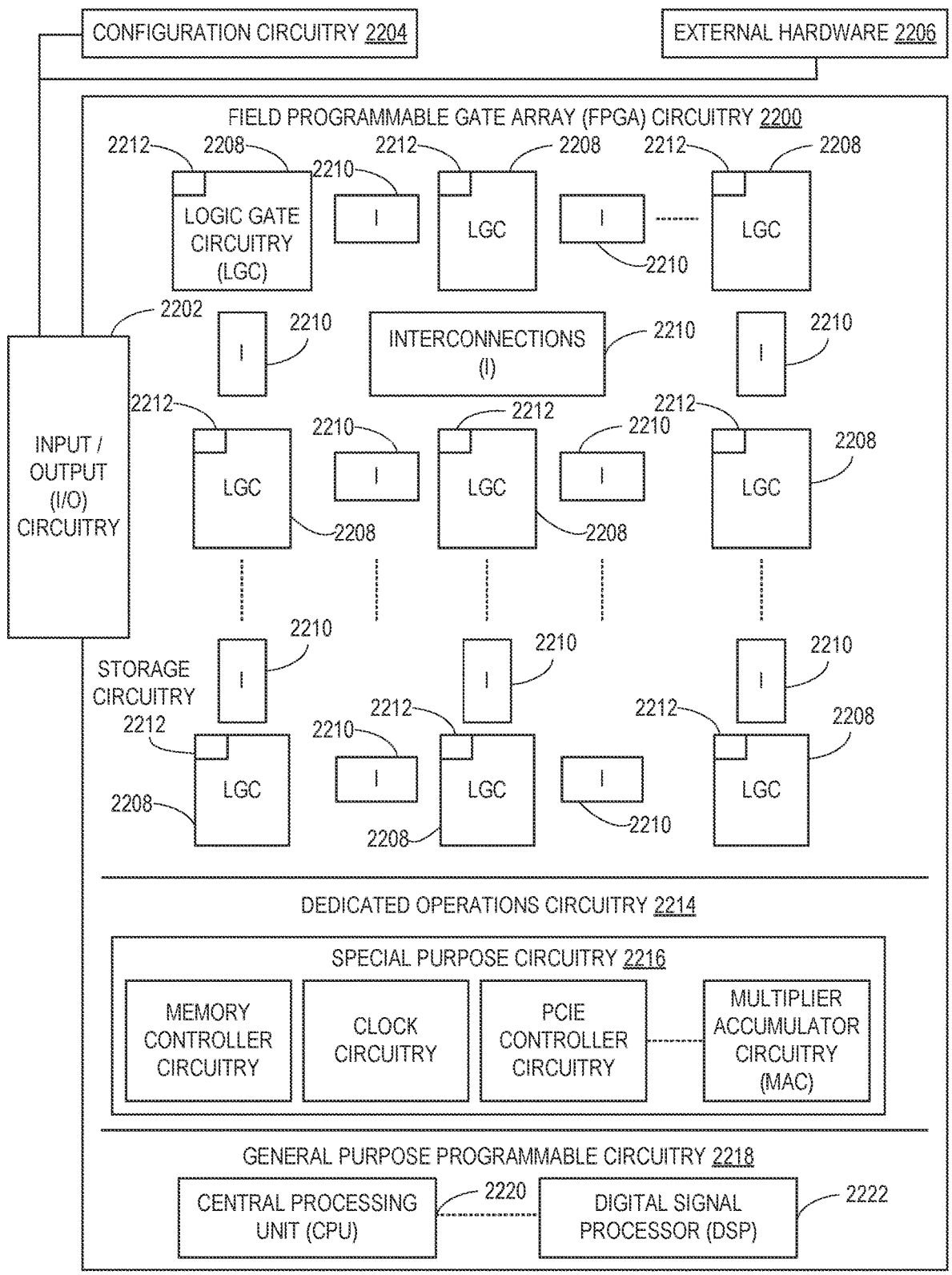
FIG. 22 is a block diagram of another example implementation of the processor circuitry of FIG. 16.

FIG. 22 is a block diagram of another example implementation of the processor circuitry 1612 of FIG. 16. In this example, the processor circuitry 1612 is implemented by FPGA circuitry 2200. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions represented by the flowchart of FIG. 15 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the flowchart of FIG. 15. In particular, the FPGA 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the flowchart of FIG. 15. As such, the FPGA circuitry 2200 may be structured to effectively instantiate some or all of the machine readable instructions of the flowchart of FIG. 15 as dedicated logic circuits to perform the operations corresponding to those software instructions in a dedicated manner analogous to an ASIC. Therefore, the FPGA circuitry 2200 may perform the operations corresponding to the some or all of the machine readable instructions of FIG. 15 faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware (e.g., external hardware circuitry) 2206. For example, the configuration circuitry 2204 may implement interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may implement the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and interconnections 2210 are configurable to instantiate one or more operations that may correspond to at least some of the machine readable instructions of FIG. 15 and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 1612 of FIG. 16, many other approaches are contemplated. For example, as mentioned above, modern FPGA circuitry may include an on-board CPU, such as one or more of the example CPU 2220 of FIG. 22. Therefore, the processor circuitry 1612 of FIG. 16 may additionally be implemented by combining the example microprocessor 2100 of FIG. 21 and the example FPGA circuitry 2200 of FIG. 22. In some such hybrid examples, a first portion of the machine readable instructions represented by the flowchart of FIG. 15 may be executed by one or more of the cores 2102 of FIG. 21 and a second portion of the machine readable instructions represented by the flowchart of FIG. 15 may be executed by the FPGA circuitry 2200 of FIG. 22.

In some examples, the processor circuitry 1612 of FIG. 16 may be in one or more packages. For example, the processor circuitry 2100 of FIG. 21 and/or the FPGA circuitry 2200 of FIG. 22 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Example 1 includes an apparatus to transfer a fluid from a first location to a second location. The example apparatus of Example 1 includes a first compressor unit and a second compressor unit fluidly coupled between the first and second locations, and a valve coupled between the first and second compressor units, the valve to switch between a first state and a second state, the fluid to flow through the first and second compressor units in a parallel configuration when the valve is in the first state, the fluid to flow through the first and second compressor units in a series configuration when the valve is in the second state.

Example 2 includes the apparatus of Example 1, and further includes a differential pressure sensor fluidly coupled between the first and second locations and operatively coupled to the valve, the differential pressure sensor to switch the valve between the first and second states based on a differential pressure between the first and second locations.

Example 3 includes the apparatus of Example 2, where the differential pressure sensor switches the valve from the first state to the second state when the differential pressure exceeds a pressure threshold.

Example 4 includes the apparatus of Example 1, where the valve is a first valve, and further includes a second valve operatively coupled between first and second compression cylinders of one of the first compressor unit or the second compressor unit.

Example 5 includes the apparatus of Example 4, where one of the first compression cylinder or the second compression cylinder is disabled when the second valve is in the second state.

Example 6 includes the apparatus of Example 1, where the valve is a first valve, and further includes a second valve coupled between the first and second compressor units, the first compressor unit to be inactive when the first valve is in the first state and the second valve is in the second state.

Example 7 includes the apparatus of Example 1, where the fluid is compressed to a first pressure when the first and second compressor units are in the parallel configuration and the fluid is compressed to a second pressure when the first and second compressor units are in the series configuration, the second pressure greater than the first pressure.

Example 8 includes a method to transfer a fluid from a first location to a second location. The example method of Example 8 includes measuring a differential pressure between the first and second locations, switching a valve to a first state when the differential pressure is at or below a threshold, the fluid to flow through first and second compressor units in a parallel configuration when the valve is in the first state, and switching the valve to a second state when the differential pressure is above the threshold, the fluid to flow through the first and second compressor units in a series configuration when the valve is in the second state.

Example 9 includes the method of Example 8, where the differential pressure is a first differential pressure, and further includes measuring a second differential pressure between first and second compression cylinders of one of the first compressor unit or the second compressor unit.

Example 10 includes the method of Example 9, where the threshold is a first threshold, and further includes disabling one of the first compression cylinder or the second compression cylinder when the second differential pressure satisfies a second threshold.

Example 11 includes the method of Example 8, where the valve is a first valve, and further includes causing the first compressor unit to be inactive when the first valve is in the first state and a second valve coupled between the first and second compressor units is in the second state.

Example 12 includes the method of Example 11, and further includes preventing flow of the fluid to the first compressor unit when the first compressor unit is inactive.

Example 13 includes the method of Example 8, and further includes compressing the fluid to a first pressure when the first and second compressor units are in the parallel configuration and compressing the fluid to a second pressure when the first and second compressor units are in the series configuration, the second pressure greater than the first pressure.

Example 14 includes an apparatus to transfer a fluid from a first location to a second location. The example apparatus of Example 14 includes first means for compressing and second means for compressing fluidly coupled between the first and second locations, and means for switching coupled between the first and second means for compressing, the means for switching to switch between a first state and a second state, the fluid to flow through the first and second means for compressing in a parallel configuration when the means for switching is in the first state, the fluid to flow through the first and second means for compressing in a series configuration when the means for switching is in the second state.

Example 15 includes the apparatus of Example 14, and further includes means for measuring fluidly coupled between the first and second locations and operatively coupled to the means for switching, the means for measuring to switch the means for switching between the first and second states based on a differential pressure between the first and second locations.

Example 16 includes the apparatus of Example 15, where the means for measuring switches the means for switching from the first state to the second state when the differential pressure exceeds a pressure threshold.

Example 17 includes the apparatus of Example 14, where the means for switching is a first means for switching, and further includes second means for switching operatively coupled between first and second means for receiving fluid of one of the first means for compressing or the second means for compressing.

Example 18 includes the apparatus of Example 17, where one of the first means for receiving fluid or the second means for receiving fluid is disabled when the second means for switching is in the second state.

Example 19 includes the apparatus of Example 14, where the means for switching is a first means for switching, and further includes second means for switching coupled between the first and second means for compressing, the first means for compressing to be inactive when the first means for switching is in the first state and the second means for switching is in the second state.

Example 20 includes the apparatus of Example 14, where the fluid is compressed to a first pressure when the first and second means for compressing are in the parallel configuration and the fluid is compressed to a second pressure when the first and second means for compressing are in the series configuration, the second pressure greater than the first pressure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

From the foregoing, it will be appreciated that example systems, methods, apparatus, and articles of manufacture have been disclosed that cause a set of compressors to switch between a series configuration and a parallel configuration for transferring fluid. Examples disclosed herein enable the set of compressors to be configured in series or in parallel based on a differential pressure of the fluid and, as such, increase or reduce a rate and/or pressure of compression of the fluid. Advantageously, examples disclosed herein enable a fluid transfer system to be used for multiple operations with varying differential pressures of the fluid, thus eliminating the need to configure multiple fluid transfer systems for different operations.

The following claims are hereby incorporated into this Detailed Description by this reference, with each claim standing on its own as a separate embodiment of the present disclosure.

What is claimed is:

1. An apparatus to transfer a fluid from a first location to a second location, the apparatus comprising:
    an inlet line to fluidly couple the first location to a first compressor unit;
    a discharge line to fluidly couple a second compressor unit to the second location, the second compressor unit including:
        a first compression cylinder coupled to a second compression cylinder;
        a first piston slidable within the first compression cylinder;
        a second piston slidable within the second compression cylinder, the second piston operatively coupled to the first piston to move with the first piston;
        inlet piping fluidly coupled between the inlet line and the first and second compression cylinders; and
        a first three-way valve operatively coupled to the inlet piping upstream of the second compression cylinder, the first three-way valve to switch between a first state and a second state, the first three-way valve in the first state to enable the fluid to flow to the second compression cylinder, the first three-way valve in the second state to restrict the fluid from flowing to the second compression cylinder, movement of the first and second pistons to cause existing fluid in the second compression cylinder to cycle through the second compression cylinder when the first three-way valve is in the second state;
    a differential pressure sensor fluidly coupled to the inlet line and to the discharge line, the differential pressure sensor to measure a differential pressure between the inlet line and the discharge line; and
    a second three-way valve coupled between the first and second compressor units, the differential pressure sensor to switch the second three-way valve between a third state and a fourth state based on the pressure differential, the fluid to flow through the second three-way valve and through the first and second compressor units in a parallel configuration when the second three-way valve is in the third state, the fluid to flow through the second three-way valve and through the first and second compressor units in a series configuration when the second three-way valve is in the fourth state.

2. The apparatus of claim 1, wherein the differential pressure sensor switches the second three-way valve from the third state to the fourth state when the differential pressure exceeds a pressure threshold.

3. The apparatus of claim 1, wherein one of the first compression cylinder or the second compression cylinder is disabled when the first three-way valve is in the second state.

4. The apparatus of claim 1, further including a third three-way valve coupled between the first and second compressor units, the first compressor unit to be inactive when the second three-way valve is in the third state and the third three-way valve is in the fourth state.

5. The apparatus of claim 1, wherein the fluid is compressed to a first pressure when the first and second compressor units are in the parallel configuration and the fluid is compressed to a second pressure when the first and second compressor units are in the series configuration, the second pressure greater than the first pressure.

6. An apparatus to transfer a fluid from a first location to a second location, the apparatus comprising:
  an inlet line to fluidly couple the first location to first means for compressing;
  a discharge line to fluidly couple second means for compressing to the second location, the second means for compressing including:
    first means for receiving fluid coupled to second means for receiving fluid;
    a first piston slidable within the first means for receiving fluid;
    a second piston slidable within the second means for receiving fluid, the second piston operatively coupled to the first piston to move with the first piston;
    inlet piping fluidly coupled between the inlet line and the first and second means for receiving fluid; and
    a first three-way valve operatively coupled to the inlet piping upstream of the second means for receiving fluid, the first three-way valve to switch between a first state and a second state, the first three-way valve in the first state to enable the fluid to flow to the second means for receiving fluid, the first three-way valve in the second state to restrict the fluid from flowing to the second means for receiving fluid, movement of the first and second pistons to cause existing fluid in the second means for receiving fluid to cycle through the second means for receiving fluid when the first three-way valve is in the second state;
  means for measuring fluidly coupled to the inlet line and to the discharge line, the means for measuring to measure a differential pressure between the inlet line and the discharge line; and
  a second three-way valve coupled between the first and second means for compressing, the means for measuring to switch the second three-way valve between a third state and a fourth state based on the differential pressure, the fluid to flow through the second three-way valve and through the first and second means for compressing in a parallel configuration when the second three-way valve is in the third state, the fluid to flow through the second three-way valve and through the first and second means for compressing in a series configuration when the second three-way valve is in the fourth state.

7. The apparatus of claim 6, wherein the means for measuring switches the second three-way valve from the third state to the fourth state when the differential pressure exceeds a pressure threshold.

8. The apparatus of claim 6, wherein one of the first means for receiving fluid or the second means for receiving fluid is disabled when the first three-way valve is in the second state.

9. The apparatus of claim 6, further including a third three-way valve coupled between the first and second means for compressing, the first means for compressing to be inactive when the second three-way valve is in the third state and the third three-way valve is in the fourth state.

10. The apparatus of claim 6, wherein the fluid is compressed to a first pressure when the first and second means for compressing are in the parallel configuration and the fluid is compressed to a second pressure when the first and second means for compressing are in the series configuration, the second pressure greater than the first pressure.

* * * * *